US012691625B2

(12) United States Patent
Forloni et al.

(10) Patent No.: US 12,691,625 B2
(45) Date of Patent: Jul. 28, 2026

(54) MULTILAYER, COEXTRUDED POLYOLEFIN FILM AND MANUFACTURE THEREOF ON TRIPLE BUBBLE LINES

(71) Applicant: Cryovac, LLC, Charlotte, NC (US)

(72) Inventors: Roberto Forloni, Rho (IT); Giuliano Zanaboni, Trecate (IT)

(73) Assignee: Cryovac, LLC, Charlotte, NC (US)

( * ) Notice: Subject to any disclaimer, the term of this patent is extended or adjusted under 35 U.S.C. 154(b) by 176 days.

(21) Appl. No.: 18/019,510

(22) PCT Filed: Aug. 5, 2021

(86) PCT No.: PCT/EP2021/071870
§ 371 (c)(1),
(2) Date: Feb. 3, 2023

(87) PCT Pub. No.: WO2022/029228
PCT Pub. Date: Feb. 10, 2022

(65) Prior Publication Data
US 2023/0286199 A1 Sep. 14, 2023

(30) Foreign Application Priority Data
Aug. 6, 2020 (EP) .................................... 20189736

(51) Int. Cl.
| | |
|---|---|
| *B29C 48/21* | (2019.01) |
| *B29C 48/00* | (2019.01) |
| *B29C 48/08* | (2019.01) |
| *B29K 23/00* | (2006.01) |
| *B29K 29/00* | (2006.01) |
| *B29K 33/00* | (2006.01) |

(52) U.S. Cl.
CPC ............ *B29C 48/21* (2019.02); *B29C 48/022* (2019.02); *B29C 48/08* (2019.02); *B29K 2023/06* (2013.01); *B29K 2023/12* (2013.01); *B29K 2023/16* (2013.01); *B29K 2029/04* (2013.01); *B29K 2033/12* (2013.01)

(58) Field of Classification Search
None
See application file for complete search history.

(56) References Cited

U.S. PATENT DOCUMENTS

| | | | | |
|---|---|---|---|---|
| 4,357,288 | A | * | 11/1982 | Oas ..................... B29C 45/0001 |
| | | | | 264/537 |
| 4,588,650 | A | * | 5/1986 | Mientus ..................... C08J 5/18 |
| | | | | 525/240 |
| 4,726,984 | A | | 2/1988 | Shah |
| 4,841,605 | A | | 6/1989 | Schuierer |
| 5,152,946 | A | | 10/1992 | Gillette |
| 5,667,902 | A | | 9/1997 | Brew et al. |

(Continued)

FOREIGN PATENT DOCUMENTS

| | | | | |
|---|---|---|---|---|
| EP | 2805821 | | 11/2014 | |
| GB | 2246741 A | * | 2/1992 | ............. B32B 27/08 |

*Primary Examiner* — Ramsey Zacharia
(74) *Attorney, Agent, or Firm* — Jason R. Womer

(57) ABSTRACT

The present invention relates to a multilayer, polyolefin-based packaging film which does not contain any poly-amides or polyesters and to a method to manufacture such film through the Triple Bubble technology. The present invention also relates to the use of such film for packaging products, especially food products and to the packages obtained with such film.

19 Claims, 1 Drawing Sheet

(56) References Cited

U.S. PATENT DOCUMENTS

| | | | |
|---|---|---|---|
| 5,876,857 | A | 3/1999 | Schuhmann et al. |
| 6,291,063 | B1 | 9/2001 | Shah et al. |
| 6,551,674 | B2 | 4/2003 | Piper et al. |
| 6,602,455 | B1 | 8/2003 | Forloni |
| 6,787,220 | B2 | 9/2004 | Wallace et al. |
| 6,824,878 | B2 | 11/2004 | Migliorini et al. |
| 6,924,041 | B2 | 8/2005 | Lee et al. |
| 7,018,719 | B2 | 3/2006 | Ueyama et al. |
| 7,517,569 | B2 | 4/2009 | Kreitman et al. |
| 8,657,495 | B2 | 2/2014 | Maxwell et al. |
| 9,783,352 | B2 | 10/2017 | Hausmann et al. |
| 2003/0157354 | A1 | 8/2003 | Van Veghel et al. |
| 2004/0016208 | A1* | 1/2004 | Mumpower ............ B32B 27/08 |
| | | | 53/411 |
| 2007/0172614 | A1 | 7/2007 | Lee |
| 2009/0208717 | A1 | 8/2009 | Enzinger et al. |
| 2013/0196166 | A1 | 8/2013 | Lu |
| 2015/0104627 | A1 | 4/2015 | O'Donnell et al. |
| 2016/0185085 | A1 | 6/2016 | Spigaroli |
| 2016/0207275 | A1 | 7/2016 | Schiffmann |
| 2018/0099492 | A1* | 4/2018 | Yun .................... B29C 48/0018 |

* cited by examiner

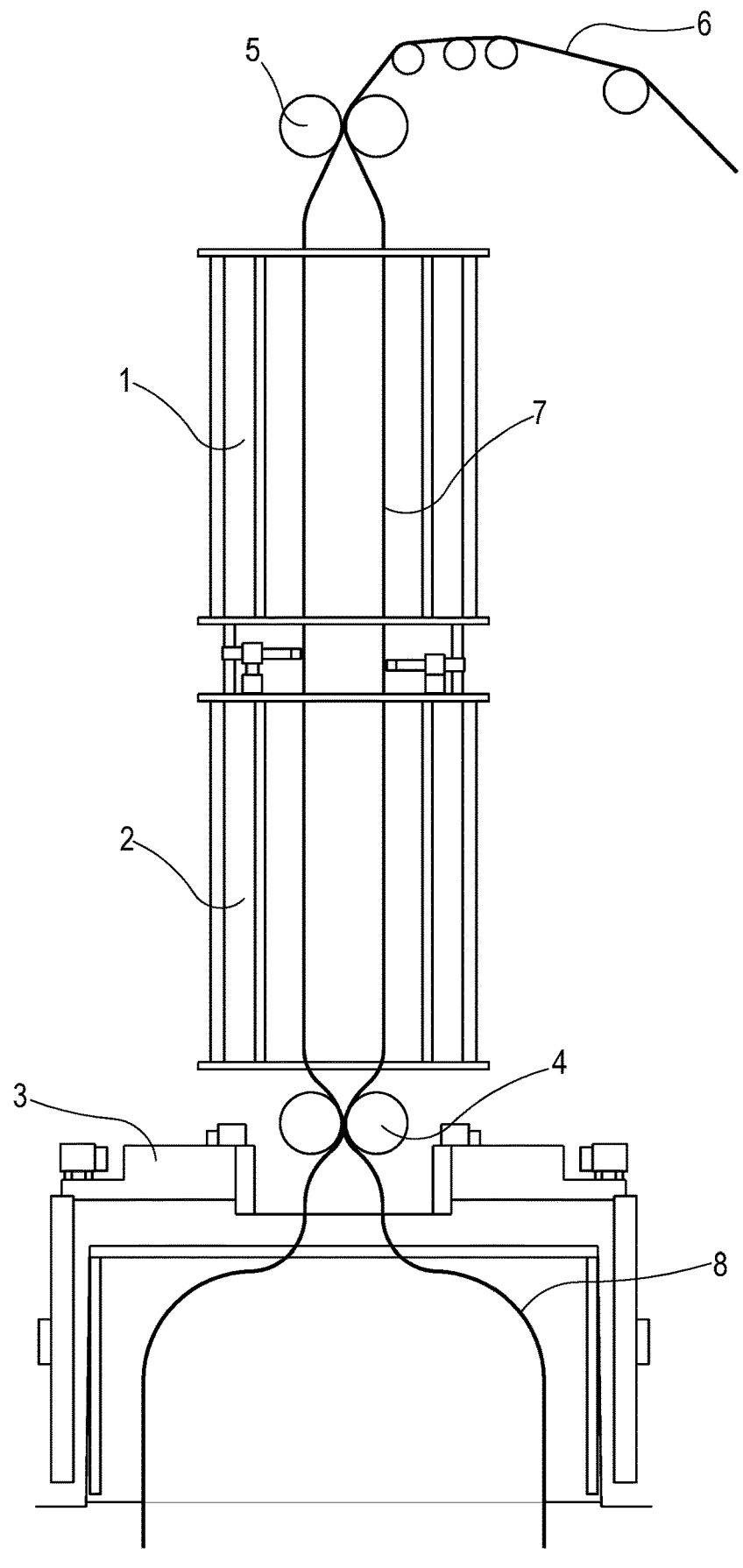

MULTILAYER, COEXTRUDED POLYOLEFIN FILM AND MANUFACTURE THEREOF ON TRIPLE BUBBLE LINES

TECHNICAL FIELD

The present invention relates to a multilayer, polyolefin-based film which can be manufactured on Triple Bubble coextrusion lines and to its use in packaging, especially of food products.

BACKGROUND ART

Triple Bubble is a well-known technology to manufacture biaxially oriented plastic films. In Triple Bubble technology a plastic film is first coextruded through a round die and a tube (first bubble) is obtained and cooled. The tube is then heated by means of ovens emitting infrared radiation (IR ovens), and a second bubble is formed by stretching the tube longitudinally while at the same time blowing air in the tube; this second bubble (also called orientation bubble) serves the purpose of orienting the polymer chains thus providing the film with shrinking properties and further enhancing some features of the film, such as mechanical properties. The tubular film is collected and lay-flattened before being again re-heated and blown thus forming a third bubble (also called annealing bubble or heat-setting bubble) to heat set the film and remove the internal tensions of the film.

The Triple Bubble technology is a manufacturing process well known in the art and is described thoroughly, e.g. in the following documents: WO 2010/094308 in the name of Kuhne and EP1296830 in the name of Kureha.

The limit of the present Triple Bubble technology resides in the composition of the films, which can be manufactured through it. In fact, in order to have an easy and stable orientation process (second bubble) the films must contain high amounts of polyamides and/or polyesters (e.g. PET) in their structures. This is because polyamides and/or polyesters based materials well adsorb the wavelength of the infrared (IR) ovens currently used to heat the film in the pre-heating ovens and in the orientation ovens, while other polymers, in particular polyolefins, which are broadly used in manufacturing plastic films do not.

Nowadays the issues of sustainability and recyclability of packaging materials are becoming more and more urging and plastic materials are often stigmatized. In particular, "multi-material" plastic films, containing different types of polymers are considered problematic because of their difficult recyclability, as they cannot be conveyed in any recycling streams and must thus be addressed to incineration, with heavy consequences in terms of costs, material waste and air pollution. In this regard, plastic materials containing polyamides and/or polyesters in addition to polyolefins are particularly difficult to be recycled and there is a strong push forward to avoid them. Rather, there is currently a strong incentive towards the so-called "mono-material" plastic films, i.e. films mainly made of a single type of easily recyclable resin such as PET (polyethylene terephthalate), or polyolefins. Polyethylene or polypropylene based films are particularly promising under the point of view of recyclability as there are well established recycling streams for these materials.

ASTM International has developed a Resin Identification Coding System, often abbreviated as RIC, which assigns a numerical code to plastic items, identifying which type of plastic polymers it is made of. The numerical code is generally marked on the plastic item, inside a triangle. For example, code "1" stands for polyethylene terephthalate (PET) made articles, code "4" stands for low-density polyethylene (LDPE) made articles, code "5" stands for polypropylene (PP) made articles, and so on. Articles which are substantially mono-materials (most commonly PET articles such as water and soft drinks bottles, trays, containers, PE articles such as shopping bags and various containers, PP articles such as disposable dishware), can be easily recycled in dedicated recycle streams, namely the RIC 1 stream, the RIC 4 stream, the RIC 5 stream.

In this scenario, in the last years priority has been given to the development of polyolefin based films (mainly PE and PP films) with a various range of properties, in order to meet the needs for such films in many application fields. Yet, based on the technology available, flat coextrusion (optionally followed by tenterframe orientation), round cast and the double bubble process have always been the manufacturing techniques of choice to manufacture these films.

On the other hand, manufacturing polyolefin films by triple bubble technology would be advantageous in terms of improved optics and barrier, adjustable shrinkage and mechanics of the films.

Therefore, there is a strong need in the art to provide a multilayer, polyolefin based, heat-sealable film, which can be prepared by the triple bubble technique, which is an effective and convenient manufacturing method. Such film would also offer the advantage of being sustainable and recyclable in the appropriate polyolefin RIC stream (i.e. RIC4 or RIC5), thus meeting the current requirements for plastic material disposal.

US 2009/208717 A1 in the name of Helmut Henzinger and assigned to Bruckner Maschinehau GMBH & Co. KG, is directed to biaxially oriented polyolefin films with an EVOH barrier layer. All the exemplary films have a biaxially oriented polypropylene (BOPP) layer as the sealant layer, which allows the films to be sealed upon themselves or onto polypropylene substrates. US 2009/208717 A1 does not disclose polyamide and/or polyester free films capable of sealing on a variety of substrates, specifically of sealing on polyester (e.g. PET, APET) substrates.

SUMMARY OF THE INVENTION

The inventors of the present invention have surprisingly found that it is possible to overcome the limits of the Triple Bubble technology and obtain a polyamide and/or polyester completely free multilayer film through this process. In particular, the inventors were capable of manufacturing a polyolefin-based film by the Triple Bubble technique, thanks to the combination of proper processing conditions and specific accessories in the equipment.

Accordingly, an object of the present invention is a biaxially oriented, coextruded multilayer packaging film comprising at least 60%, preferably at least 70%, more preferably at least 80% by weight of one or more polyolefins based on the total weight of the film, comprising at least the following layers:

an outer heat sealable layer a) comprising, preferably consisting essentially of polymers selected from the group consisting of polyolefins, ethylene vinyl acetate copolymers (EVA), ethylene(meth)acrylate/(meth) acrylic acid copolymers, ethylene butyl acrylate copolymers (EBA) and mixtures thereof, the total amount of ethylene vinyl acetate copolymers (EVA), ethylene (meth)acrylate/(meth)acrylic acid copolymers and ethylene butyl acrylate copolymers (EBA) in the heat sealable layer being not higher than 30% by weight based on the total weight of the film;

an inner gas barrier layer b) comprising, preferably consisting essentially of ethylene-vinyl alcohol (EVOH), wherein the EVOH content is comprised between 3% and 25%, preferably between 5% and 20%, even more preferably between 7% and 15% by weight based on the total weight of the film; and an outer layer c) comprising one or more polyolefins, wherein the film does not contain any polyamide or polyester, and wherein the film has at least one, preferably at least two, of the following features:

elastic modulus higher than 4000 kg/cm$^2$ in both the longitudinal direction (LD) and the transverse direction (TD), measured in accordance to ASTM D 882 at 23° C.;

elongation at break of at most 200% in both the longitudinal direction (LD) and the transverse direction (TD), measured in accordance to ASTM D 882 at 23° C.;

tensile strength at break higher than 500 kg/cm$^2$ in both the longitudinal direction (LD) and the transverse direction (TD), measured in accordance to ASTM D 882 at 23° C.

A further object of the present invention is a triple bubble process for manufacturing the multilayer packaging film according to the invention, such process comprising, in order, the steps of:

i) co-extruding through a round die the melted thermoplastic polymers of the film, to form a co-extruded multilayer tube comprising at least layers a), b) and c), ii) cooling the co-extruded multilayer tube, preferably with water, to a temperature below the lowest melting point of the thermoplastic polymers, and passing it through deflate rolls, providing a flat tube (6), iii) moving the tube through a couple of pinch rolls (5) and pre-heating the tube to a temperature comprised between 80° C. and 130° C. through pre-heating ovens (1, 2) emitting infrared radiation (IR), iv) further heating the pre-heated tube to keep its temperature between 80° C. and 130° C. through heating orientation oven(s)(s) (3) emitting infrared radiation (IR), while biaxially orienting the tube by longitudinally pulling it through a couple of deflate rolls and transversally expanding it by blowing a gas in the multilayer tube, with an orientation ratio, in both the longitudinal direction and the transverse direction, comprised between 2.5:1 and 6:1, thus providing a biaxially oriented tube (8), v) cooling the oriented tube (8), preferably at a temperature of 12-18° C. and preferably through air rings, passing it through a series of converging rolls and lay-flattening it, vi) optionally bringing the temperature of the lay flattened film at to 40° C. to 60° C., preferably by passing it through a bath of water, vii) heat-setting the tube by longitudinally lifting it up through a couple of pinch rolls and by blowing a gas in the tube, while heating it at a temperature comprised between 60° C. to 150° C., viii) passing the heat-set tube through a series of converging rolls, lay-flattening it and winding it, wherein:

in step iii) and step iv) the wavelength of the IR radiation emitted by the pre-heating ovens (1, 2) and by the heating orientation oven(s) (3) matches the absorbance wavelength of the polyolefins, preferably a wavelength from 2500 cm$^{-1}$ to 3000 cm$^{-1}$; and optionally, in step iv) the pre-heated tube (7) passes through an additional couple of pinch rolls (4) positioned between the pre-heating ovens (1, 2) and the heating orientation oven(s) (3).

A further object is the film of the present invention obtainable according to the process of the present invention.

In a further object, the present invention regards a flexible container obtainable by heat-sealing the film according to the invention on itself, or by heat-sealing a first and a second film, of which at least the first film is a film according to the invention, and the second film, if different, is preferably a polyolefin film, wherein the outer heat sealable layer a) of the film(s) according to the invention face(s) the inside of the container.

A further object of the invention is a thermoformed support obtainable by thermoforming the multilayer packaging film according to the invention.

A further object of the present invention is a package comprising a multilayer packaging film or a flexible container and/or a thermoformed support, according to the invention, and a product packaged therein.

In a further object, the invention is directed to the use of the film of the invention for packaging products, preferably food products. Typically, these food products are selected from the group consisting of fresh red meat, processed meat, fish, poultry, cheese, fruits and vegetables.

Definitions

As used herein, the expression "a film (or a layer) consisting essentially" of (a) certain polymer(s) refers to a film (or a film layer) comprising at least 80%, 90%, 95%, 98% by weight of such polymer(s). As used herein, the term "polyolefin" is used with reference to any thermoplastic polymer deriving from polymerisation of one or more olefins, such as ethylene, propylene and butene. The polymer may be a homopolymer, consisting of repeating units of one single olefin or a copolymer, consisting of a major proportion of one olefin and a minor proportion of one or more other olefins copolymerizable therewith.

The term polyolefin specifically includes ethylene homo- and co-polymers, butene homo- and copolymers, propylene homo- and co-polymers, cycloolefins copolymers and the like.

The term polyolefins also encompasses copolymers of ethylene comprising a major portion of ethylene and a minor portion of one or more alpha-olefins comonomers, preferably (C4-C10)-alpha-olefins, such as 1-butene, 1-hexene and/or 1-octene. These copolymers are generally referred to as "ethylene-alpha-olefin copolymers". Depending on the composition in monomers and polymerization process employed, polymers with a different degree of branching and a different density can be obtained. For example, the above term include polymers such as high density polyethylene (HDPE), with a density usually higher than 0.945 g/cc, linear medium density polyethylene (LMDPE) with a density usually in the range of from about 0.930 g/cc to about 0.945 g/cc, linear low density polyethylene (LLDPE) with a density usually in the range of from about 0.900 g/cc to about 0.930 g/cc, and very low and ultra low density polyethylene (VLDPE and ULDPE) with a density lower than about 0.915 g/cc, typically in the range 0.868 to 0.915 g/cc. PE obtained using metallocene catalysts are also included.

As used herein, the expression "long chain branching" refers to the presence, in polyethylene, of ramifications ("branches") wherein polyethylene molecules have at least one branching point and each branch departing from a branching point has a length of at least 8 carbon atoms. A preferred long chain branched polyethylene is Low Density Polyethylene (LDPE).

The term polyolefins also encompasses cycloolefins copolymers (COC), namely thermoplastic materials produced by copolymerization of cycloolefins—such as norbornene or cyclopentadiene—with ethylene preferably using a metallocene catalyst.

As used herein, the expressions "ethylene-vinyl acetate copolymer" or "EVA" refer to a copolymer formed from ethylene and vinyl acetate monomers or from ethylene, vinyl acetate and carbon monoxide monomers, wherein the ethylene derived units in the copolymer are present in major amounts, preferably between about 60% and 98% by weight, more preferably between about 70% and about 96% by weight, even more preferably between about 80% and about 95% by weight, still more preferably between about 75% and about 94% and the vinyl acetate and monoxide derived units in the copolymer are present in minor amounts, preferably between about 2% and about 40% by weight, more preferably between about 4% and about 30% by weight, even more preferably between about 5% and about 25%, still more preferably between about 6% and about 20%, for example 18% by weight.

As used herein, the term "ethylene(meth)acrylate/(meth) acrylic acid copolymer" refers to a copolymer of ethylene with (meth)acrylate esters or (meth)acrylic acid.

As used herein, the term "copolymer of ethylene with (meth)acrylate esters" refers to a copolymer of ethylene with methacrylate or acrylate esters. For example, the term includes ethylene-ethyl (meth)acrylate co-polymer, ethylene-butyl (meth)acrylate co-polymer, ethylene-methyl (meth)acrylate co-polymer and the like. The copolymer typically contains between 15 to 40%, preferably between 20 and 30% by weight of acrylate or methacrylate units.

As used herein, the term "copolymer of ethylene with (meth)acrylic acid" refers to a copolymer of ethylene with acrylic or methacrylic acid.

As used herein the expressions "ionomer" or "neutralized" referred to an ethylene(meth)acrylic acid copolymer refer to an ethylene(meth)acrylic acid copolymer, partially neutralized with a mono or divalent metal ion, such as zinc, lithium, sodium, potassium, calcium and magnesium. Commercially available resins of this kind are Surlyn by Dow.

As used herein the term "modified" refers to a polymer modified with an anhydride functionality, either grafted onto the polymer or copolymerised therewith. The anhydride functionality can be an anhydride of maleic acid, crotonic acid, citraconic acid, itaconic acid, fumaric acid, etc., and is inclusive of derivatives of such functionalities, such as acids, esters, and metal salts derived therefrom.

As used herein the term "anhydride modified polyolefin" refers to a polyolefin having an anhydride functionality associated therewith, either grafted onto the polymer or copolymerised therewith. The anhydride functionality can be an anhydride of maleic acid, crotonic acid, citraconic acid, itaconic acid, fumaric acid, etc., and is inclusive of derivatives of such functionalities, such as acids, esters, and metal salts derived therefrom.

As used herein the expression "masterbatch" refers to a premixed composition in which one or more additives are dispersed into a carrier resin. A masterbatch is typically provided as granules or pellets, and is generally blended with one or more target resins during extrusion, in order to impart to the final product the properties of the additive(s). The carrier resin of the masterbatch and the target resins to which the masterbatch is added can be the same or different, and can be either chemically compatible or non-compatible. In the context of the present invention, the masterbatch preferably comprises an antifog agent.

As used herein, the expressions "inner layer" and "internal layer" refer to a layer of the film having both of its principal surfaces directly adhered to another layer of the film.

As used herein, the expressions "outer layer" or "external layer" refer to a layer of the film having only one of its principal surfaces directly adhered to another layer of the film.

As used herein, the phrase "(directly) adheres", as applied to layers, refers to adhesion of the subject layer to the object layer by direct contact with each other, without a tie layer, an adhesive, or other layer therebetween.

As used herein, the expressions "sealant layer" or "heat sealable layer" refer to the outer layer of the film, which is involved in the heat-sealing of the film to itself, to another film, or to a substrate, e.g. a container. Heat sealing can be performed by any one or more of a wide variety of manners, such as for example melt bead sealing, thermal sealing, impulse sealing, ultrasonic sealing, hot air, hot wire, infrared radiation etc.

As used herein, the term "easy-opening" layer or package refers to a layer of a multilayer film or to a package that easily breaks down and open by application of appropriate opposing forces, typically by hand.

As used herein, the term "co-extrusion" refers to the process of extruding two or more molten thermoplastic polymers through a single die with two or more orifices arranged so that the extrudates merge and weld together into a laminar structure before chilling, i.e., quenching. Co-extrusion can be employed in film blowing and extrusion coating processes.

As used herein, the term "coextruded film" refers to a film obtained, either fully or partially, by coextrusion.

As used herein, the term "orientation" refers to the process of simultaneous stretching the blown film carried out at a temperature higher than the Tg (glass transition temperatures) of all the resins making up the layers of the structure and lower than the temperature at which all the resins making up the layers of the structure are in the molten state. The orientation is performed by simultaneously stretching longitudinally the blown tubular film by means of pinch rolls while stretching transversally the tube by blowing a gas in the tube, in the so-called "second bubble" of the Triple Bubble technology. Such orientation is bi-axial.

The phrases "orientation ratio in longitudinal (or machine) direction" and "orientation ratio in transverse direction" refer to the number of times the film has been oriented in that direction in relation to its original size. For example, if a film has been oriented to three times its original size in the longitudinal direction, the orientation ratio in longitudinal direction is 3:1.

As used herein, the phrases "longitudinal direction (LD)" or "machine direction", refer to a direction "along the length" of the film, i.e., in the direction of the film as the film is formed during coextrusion. As used herein, the phrase "transverse direction (TD)", refers to a direction across the film, perpendicular to the machine or longitudinal direction.

As used herein the phrases "heat-shrinkable," "heat-shrink," and the like, refer to the tendency of the biaxially oriented film to shrink upon the application of heat, such that the size of the film decreases while the film is in an unrestrained state.

As used herein, the term "support" refers to any object suitable for supporting or containing a product.

The support may be flat or hollow and may be rigid, semi-rigid or flexible. Suitable examples of supports are, for instance, a tray, a bowl, a dish, a box, a flat support. Hollow supports are generally referred to as containers.

Supports, typically the hollow supports, are optionally provided with a sealing area, such as a sealing flange, suitable for being sealed to the sealant layer of a film.

As used herein the term "flexible container" refers to a container obtainable by heat-sealing a single piece of film in the form of an envelope, a bag or a pouch or by heat-sealing two identical or different films. Bags or pouches include, for example: lay-flat, end-seal bags made from a seamless tubing and having an open top, first and second folded side edges, and an end seal across a bottom of the bag; lay-flat side seal bags made from a seamless tubing and having an open top, a folded bottom edge and first and second side seals; lay flat, V-shaped side seal bags made from a seamless tubing and having an open top, a folded bottom edge and first and second side seals, which may be completely angled with respect to the open top, thus providing a triangular bag or partially straight (i.e. perpendicular to the open top) and then partially angled, thus providing a trapezium-like shape; lay flat pouches made by heat sealing two flat films to one another, the pouch having an open top, a first side seal, a second side seal and a bottom seal.

As used herein, the terms "lid" or "lidding film" refer to a film for closing the opening of a (semi)rigid container and/or for enclosing a product contained in a container.

DESCRIPTION OF DRAWINGS

FIG. 1 is a schematic view of a portion of the Triple Bubble line, in which the flat co-extruded multilayer tube (6), the orienting bubble (or second bubble) (7, 8), the first pinch rolls (5), the pre-heating ovens (1, 2), the heating orientation oven(s) (3) and, in between, the optional additional pinch rolls (4) are represented.

DETAILED DESCRIPTION OF INVENTION

An object of the present invention is a biaxially oriented, coextruded, multilayer packaging film comprising at least 60%, preferably at least 70%, more preferably at least 80% by weight of one or more polyolefins based on the total weight of the film, comprising at least the following layers:

an outer heat sealable layer a) comprising, preferably consisting essentially of polymers selected from the group consisting of polyolefins, ethylene vinyl acetate copolymers (EVA), ethylene(meth)acrylate/(meth) acrylic acid copolymers, ethylene butyl acrylate copolymers (EBA) and mixtures thereof, the total amount of ethylene vinyl acetate copolymers (EVA), ethylene (meth)acrylate/(meth)acrylic acid copolymers and ethylene butyl acrylate copolymers (EBA) in the heat sealable layer being not higher than 30% by weight based on the total weight of the film;

an inner gas barrier layer b) comprising ethylene-vinyl alcohol (EVOH), wherein the EVOH content is comprised between 3% and 25%, preferably between 5% and 20%, even more preferably between 7% and 15% by weight based on the total weight of the film; and an outer layer c) comprising one or more polyolefins, wherein the film does not contain any polyamide or polyester, and wherein the film has at least one, preferably at least two, of the following features:

elastic modulus higher than 4000 $kg/cm^2$ in both the longitudinal direction (LD) and the transverse direction (TD), measured in accordance to ASTM D 882 at 23° C.;

elongation at break of at most 200% in both the longitudinal direction (LD) and the transverse direction (TD), measured in accordance to ASTM D 882 at 23° C.;

tensile strength at break higher than 500 $kg/cm^2$ in both the longitudinal direction (LD) and the transverse direction (TD), measured in accordance to ASTM D 882 at 23° C.

The film of the present invention preferably does not contain any polymers other than polyolefins, ethylene vinyl acetate copolymers (EVA), ethylene(meth)acrylate/(meth) acrylic acid copolymers, EBA and EVOH.

In one embodiment, the film of the invention has a free shrink which is lower than 15% in both longitudinal direction (LD) and transverse direction (TD), when measured at 120° C. in oil according to ASTM D2732.

In another embodiment, the film of the invention has a free shrink which is higher than 20% in both LD and TD, when measured at 85° C. in water according to ASTM D2732, or higher than 15%, preferably comprised between 15% and 60%, more preferably comprised between 20% and 40% in both LD and TD, when measured at 120° C. in oil according to ASTM D2732.

In the present invention, the free shrink of the films is evaluated according to ASTM D2732 under different temperatures and conditions (in water, in oil) based on the composition of the films and the uses thereof, i.e. the type of packages realized with those films, as it is well known to the skilled person.

In the film according to the invention, the outer heat sealable layer a) preferably consists essentially of polyolefins, ethylene vinyl acetate copolymers (EVA), ethylene (meth)acrylate/(meth)acrylic acid copolymers, ethylene butyl acrylate copolymers (EBA) and mixtures thereof, wherein the total amount of EVA, ethylene(meth)acrylate/ (meth)acrylic acid copolymers and EBA is not higher than 30% by weight based on the total weight of the film.

In an embodiment, the outer heat sealable layer a) comprises at least 60 wt %, preferably at least 70 wt %, more preferably at least 80 wt %, even more preferably at least 85 wt %, still more preferably at least 90 wt %, at least 95 wt %, at least 98% of one or more polyolefins. The outer heat sealable layer a) may also consists essentially of one or more polyolefins.

Preferably, the polyolefins of outer heat sealable layer a) are selected from the group consisting of ethylene polymers, preferably polyethylene (PE), propylene polymers, preferably polypropylene (PP), butylene polymers, preferably polybutylene (PB), copolymers of ethylene and propylene (EP), terpolymers of ethylene, propylene and butylene (EPB) and mixtures thereof.

More preferably, the polyolefins of outer heat sealable layer a) are selected from the group consisting of polyethylene, polypropylene, copolymers of ethylene and propylene and mixtures thereof.

For example, the outer heat sealable layer a) comprises, or consists essentially of, one polyolefin only, preferably selected from the group consisting of polyethylene, polypropylene and copolymers of ethylene and propylene.

In a particularly preferred embodiment, the outer heat sealable layer a) comprises, or consists essentially of, at least two polyolefins, the first polyolefin being selected from the group consisting of ethylene polymers, ethylene copolymers, propylene polymers, copolymers of ethylene and propylene, terpolymers of ethylene, propylene and butylene (EPB) and mixtures thereof, the second polyolefin being a butylene polymer, preferably polybutylene (PB). The presence of PB in the heat sealable layer a) of the film of the invention, preferably in an amount higher than 5% by weight, preferably of at least 10% by weight, based on the total weight of the layer a), results in a peelable film, which can be peeled away in an easy and smooth way from the support on which it is heat-sealed, preferably a polyester or a polyolefin support.

Among polyethylene copolymers, ethylene-alpha-olefin copolymers are preferred, LLDPE being particularly preferred.

In a particularly preferred embodiment, the heat-sealable layer a) consists essentially of a blend of EVA, a neutralized ethylene(meth)acrylic acid copolymer (i.e. an ionomer, for example Surlyn) and polybutylene, wherein the total amount of EVA and ionomer is not higher than 30% by weight based on the total weight of the film and the amount of polybutylene is at least 5%, preferably at least 10% by weight based on the total weight of layer a). Typically, layer a) may consist essentially of a blend of 10-40 wt % of EVA, 40-80 wt % of ionomer and 5-30 wt % of PB, wherein the percentages are by weight based on the total weight of layer a).

An example of a suitable ethylene vinyl acetate copolymer is the product commercialized under the tradename Elvax 3170 by Dow.

In an embodiment, it is preferred that the polyolefins of the heat sealable layer a) of the film of the invention have a density lower than 0.95 g/cm³. Thus, low-density polyethylene (LDPE), linear low-density polyethylene (LLDPE) and medium density polyethylene (MDPE), polypropylene (PP), copolymers of ethylene and propylene (EP) and terpolymers of ethylene, propylene and butylene (EPB) are particularly suitable polymers for the outer heat-sealant layer a).

Examples of suitable linear low-density polyethylene (LLDPE) polymers are the products commercialized under the tradenames Supeer 7318 BE and Supeer 7118NE by Sabic, Eltex PF6220AA by INEOS Olefins & polymers Europe.

The product commercialized under the tradename ELTEX P KS350 by INEOS Olefins & polymers Europe is an example of a suitable ethylene, propylene and butylene terpolymer (EPB).

In an embodiment, the polyolefins of the heat sealant layer a) can be modified polyolefins, in particular can be anhydride-modified polyolefins, for example maleic anhydride-modified polyolefins.

In an embodiment, in the outer heat sealable layer a) the ethylene(meth)acrylate copolymers can be selected from ethylene $C_1$-$C_4$ alkyl (meth)acrylate copolymers, preferably from ethylene methyl (meth)acrylate copolymers, ethylene ethyl (meth)acrylate copolymers and ethylene-butyl (meth) acrylate copolymers. For example, the ethylene(meth)acrylate copolymers may be ethylene methylacrylate copolymers.

An example of a suitable ethylene methacrylate copolymer is the product commercialized under the tradename Elvaloy 1820 AC by Dow.

In an embodiment, in the outer heat sealable layer a) the ethylene(meth)acrylic acid copolymers may be neutralized, i.e. can be in the form of ionomers. Preferably, the neutralizing ion is zinc, more preferably, it is sodium. For example, suitable ionomers can be those marketed by Dow under the tradename Surlyn.

In an embodiment, the ethylene(meth)acrylate/(meth) acrylic acid copolymers are a mixture of ethylene/methacrylic acid copolymers and ethylene/methacrylate copolymers. In another embodiment, the ethylene(meth)acrylate/ (meth)acrylic acid copolymers are mixed or copolymerized with other polymers. Such copolymers resulting from mixture or copolymerization will be referred to in the following as "modified ethylene acrylates".

Examples of such modified ethylene acrylates are the resins of the Appeel™ type marketed by DOW, such as Appeel™ 20D855 or Appeel™ 20D745, this latter being particularly preferred.

The film of the invention comprises an internal gas barrier layer b) made of ethylene-vinyl alcohol (EVOH) to reduce the permeability to gases of the film. Such gas barrier layers made of EVOH are known and generally used for manufacturing gas barrier films. In the film according to the invention, the EVOH content of the gas barrier layer is comprised between 3% and 25% by weight based on the total weight of the film, preferably it is comprised between 5% and 20%, more preferably it is comprised between 7% and 15%.

Examples of suitable EVOH copolymers are the products commercialized under the tradenames EVAL SP292B by Evalca/Kuraray and G-Soarnol GH3804B by MCPP Mitsubishi Chemical Corporation.

In the film of the invention, layer c) is the outer layer opposite the heat-sealant layer. Such outer layer is generally also referred to as skin layer or abuse layer, its role is to provide the film with improved mechanical strength and thermal resistance. In the film of the invention, outer layer c) comprises one or more polyolefins. In one embodiment, the outer layer c) comprises at least 60 wt %, preferably at least 70 wt %, more preferably at least 80 wt %, even more preferably at least 85 wt %, still more preferably at least 90 wt %, at least 95 wt %, at least 98 wt % of one or more polyolefins. The outer layer c) may also consist of one or more polyolefins.

Preferably, the polyolefins of the outer layer c) have a melting point higher than 120° C., preferably higher than 140° C., higher than 150° C., higher than 160° C., higher than 170° C. The presence of polyolefins with high melting point in the outer layer c) allows obtaining a film endowed with high thermal resistance, which can thus easily withstand the sealing temperatures and does not stick to the sealing bars when the film is sealed on itself or onto a support to form a package.

In a preferred embodiment, the outer layer c) comprises, or consists essentially of, one or more polyolefins selected from the group consisting of polyethylene polymers, preferably selected from the group consisting of MDPE, HDPE (more preferred), long chain branching polyethylene such as LDPE (even more preferred), polyethylene copolymers such as LLDPE, propylene polymers, preferably polypropylene (PP), copolymers of ethylene and propylene (EP), and mixtures thereof.

Among polyethylene copolymers, ethylene-alpha-olefin copolymers are preferred, LLDPE being particularly preferred.

As stated above, the films of the invention can advantageously be manufactured substantially as mono-material films, so that, with a view to recyclability, they can be recycled in recyclability streams such as RIC4 or RIC5.

Thus, in an embodiment, the film of the invention can preferably comprise an outer heat sealant layer a) comprising, preferably consisting essentially of, ethylene polymers, preferably polyethylene (PE) and an outer layer c) comprising, preferably consisting essentially of, polyethylene polymers, preferably MDPE, more preferably HDPE, even more preferably long chain branching polyethylene such as LDPE, or polyethylene copolymers such as LLDPE. A film consisting of layers a), b) and c) wherein the outer heat sealant layer a) consists essentially of ethylene polymers, preferably polyethylene (PE), or ethylene copolymers (preferably LLDPE) and the outer layer c) consists essentially of polyethylene polymers, preferably MDPE, more preferably HDPE, even more preferably long chain branching polyethylene such as LDPE, or ethylene copolymers (preferably LLDPE) can be disposed of in the RIC4 recycling stream.

In another embodiment, the film of the invention can preferably comprise an outer heat sealant layer a) comprising, preferably consisting essentially of propylene polymers, preferably polypropylene (PP), or copolymers of ethylene and propylene (EP), and an outer layer c) comprising, preferably consisting essentially of, propylene polymers, preferably polypropylene (PP). A film consisting of layers a), b) and c) wherein the outer heat sealant layer a) consists essentially of propylene polymers, preferably polypropylene (PP), or copolymers of ethylene and propylene (EP), and the outer layer c) consists essentially of propylene polymers, preferably polypropylene (PP) can be disposed of in the RIC5 recycling stream.

In one embodiment, the film of the present invention comprises at least 90% by weight of one or more polyolefins based on the total weight of the film.

The film of the invention may also comprise one or more inner layers d).

In an embodiment of the film of the invention, an inner layer d) directly adheres to the heat-sealant layer a). One or more inner layers d) are typically present in the layer structure of the film of the invention between the outer heat-sealant layer a) and the barrier layer b) or between the outer heat-sealant layer a) and a tie layer e), if it is present.

The inner layers d) consist essentially of polymers selected from the group consisting of polyolefins, ethylene vinyl acetate copolymers (EVA), ethylene(meth)acrylate/(meth)acrylic acid copolymers, ethylene butyl acrylate copolymers (EBA) and mixtures thereof.

Preferably, such inner layers d) consist essentially of, more preferably consist of, polyolefins only. Yet, if one or more or EVA, ethylene(meth)acrylate/(meth)acrylic acid copolymers and EBA are present, the total amount of ethylene vinyl acetate copolymers (EVA), ethylene(meth)acrylate/(meth)acrylic acid copolymers and ethylene butyl acrylate copolymers (EBA) in the film (namely, in the heat sealable layer a) and in the inner layer(s) d)) is not higher than 30% by weight based on the total weight of the film.

In one embodiment, the polyolefins of the inner layer d) can be selected from the group consisting of ethylene polymers, preferably polyethylene (PE), propylene polymers, preferably polypropylene (PP), butylene polymers, preferably polybutylene (PB), copolymers of ethylene and propylene (EP), terpolymers of ethylene, propylene and butylene (EPB) and mixtures thereof.

In another embodiment, the inner layer d) comprises, preferably consists essentially of, one polyolefin only. Particularly preferred polyolefins are selected from the group consisting of polyethylene and polypropylene. In another embodiment, the inner layer d) comprises, preferably consists essentially of a copolymer of ethylene and propylene (EP). In another embodiment, the inner layer d) comprises, preferably consists essentially of polyethylene copolymers, preferably ethylene-alpha-olefin copolymers and more preferably LLDPE.

In a preferred embodiment, an inner layer d) may be an easy-opening layer, which comprises, or consists essentially of, at least two polyolefins, a first polyolefin being selected from the group consisting of ethylene polymers, propylene polymers, copolymers of ethylene and propylene (EP), terpolymers of ethylene, propylene and butylene (EPB) and mixtures thereof, a second polyolefin being a butylene polymer, preferably polybutylene (PB). Preferably, in this embodiment the amount of PB is higher than 5% by weight, preferably higher than 10% by weight based on the total weight of the easy-opening inner layer d).

In another particularly preferred embodiment, an inner layer d) may be an easy-opening layer directly adhered to the heat-sealable layer a), said layer d) consisting essentially of a blend of EVA, a neutralized ethylene(meth)acrylic acid copolymer (i.e. an ionomer, for example Surlyn) and polybutylene, wherein the total amount of EVA and ionomer is not higher than 30% by weight, based on the total weight of the film, and the amount of polybutylene is at least 5%, preferably at least 10% by weight, based on the total weight of the easy-opening inner layer d).

In a preferred embodiment, the easy-opening inner layer d) directly adhered to the heat-sealable layer a) consists essentially of a blend of 10-40 wt % of EVA, 40-80 wt % of ionomer and 5-30 wt % of PB, wherein the percentages are by weight based on the total weight of the easy-opening layer d). The latter two embodiments are particularly preferred for inner layers d) directly adhered to the heat-sealable layer a). In fact in these embodiments, the butylene polymer, preferably polybutylene, present in the inner layer d) directly adhered to the heat-sealant layer a) provides for rupture by cohesive failure within the layer, when a force is applied to the film to detach it from a substrate. A film of the invention capable of rupturing with a cohesive failure mechanism can advantageously be employed as a lid for a support or a container, preferably wherein the support or the container is a PET (more preferably APET) or polypropylene support or container. However, cohesive failure films can be used also for manufacturing flexible containers by sealing such films according to invention to themselves or to a polyolefin film, as described below.

As used herein, "cohesive failure" means that, upon application of a force to open the package (by separating the lidding film from the container or the sealed edges of a flexible container), the film breaks internally in its second layer, i.e. in the easy-opening inner layer d) directly adhered to the heat-sealable layer a).

The composition of the inner layer(s) may be the same as or different from the composition of the heat sealable layer a).

Notably, the inner layer(s) may have the same polymer composition as layers a) and c), in order to obtain films with improved recyclability properties, specifically suitable to be conveyed in the RIC4 or RIC5 recyclability streams.

Thus, in an embodiment, the film of the invention can preferably comprise:

an outer heat sealant layer a) comprising, preferably consisting essentially, of ethylene polymers, preferably polyethylene (PE), an outer layer c) comprising, preferably consisting essentially of, polyethylene polymers, preferably MDPE, more preferably HDPE, even more preferably long chain branching polyethylene such as LDPE, and one or more inner layer(s) d) comprising, preferably consisting essentially of ethylene polymers, preferably polyethylene (PE).

A film consisting of layers a), b), c) and d) wherein the outer heat sealant layer a) consists essentially of ethylene polymers, preferably polyethylene (PE), or ethylene copolymers, preferably LLDPE, the outer layer c) consists essentially of polyethylene polymers, preferably MDPE, more preferably HDPE, even more preferably long chain branching polyethylene such as LDPE, or ethylene copolymers, preferably LLDPE, and the inner layer(s) d) consist essentially of ethylene polymers, preferably polyethylene (PE), or ethylene copolymers, preferably LLDPE, can be disposed of in the RIC4 recycling stream.

In another embodiment, the film of the invention can preferably comprise:

an outer heat sealant layer a) comprising, preferably consisting essentially of propylene polymers, preferably polypropylene (PP), or copolymers of ethylene and propylene (EP), an outer layer c) comprising, preferably consisting essentially of, propylene polymers, preferably polypropylene (PP), and one or more inner layer(s) (d) comprising, preferably consisting essentially of propylene polymers, preferably polypropylene (PP).

A film consisting of layers a), b), c) and d) wherein the outer heat sealant layer a) consists essentially of propylene polymers, preferably polypropylene (PP), or copolymers of ethylene and propylene (EP), the outer layer c) consists essentially of propylene polymers, preferably polypropylene (PP) and the inner layer(s) d) consist essentially of propylene polymers, preferably polypropylene (PP), can be disposed of in the RIC5 recycling stream.

By using Triple Bubble process, it is possible to produce films with a tailored shrink and with the desired balanced or unbalanced mechanical properties in LD and TD.

Moreover, as triple bubble technology allows films with high mechanical properties (moduli, tensiles, elongations), it is possible to save material by producing thinner films having the same performance as thicker materials.

Furthermore, triple bubble technology allows a remarkable versatility: in fact, starting from the same formulation, the film properties can be better adapted to the intended packaging applications, with improved results providing, for instance, tray lidding without tray distortion, highly shrinkable bags with perfect fit on the product or thin but resistant pouches. Particularly relevant is the possibility of imparting very different free shrink and shrink tension values to the films, even if starting from the same structure. The films of the present invention have an elastic modulus higher than 4000 kg/cm$^2$, when measured both in the longitudinal direction (LD) and in the transverse direction (TD). The elastic modulus of a plastic film measures its resistance to being deformed elastically (i.e., non-permanently) and is an index of the stiffness of the film (a stiffer material will have a higher elastic modulus). It is measured in accordance to ASTM D 882 at 23° C.

The films of the present invention have an elongation at break of at most 200% in both the longitudinal direction (LD) and the transverse direction (TD). Elongation at break represents the increase in length of the film measured at the moment of rupture and expressed as percentage of the original length. It is measured in accordance to ASTM D 882 at 23° C.

The films of the present invention have a tensile strength at break higher than 500 kg/cm$^2$ in both the longitudinal direction (LD) and the transverse direction (TD). The tensile strength at break represents the maximum tensile load per unit area of the film required to break it. It is measured in accordance to ASTM D 882 at 23° C.

Preferably, the present film has at least two of the properties defined above, more preferably it has all the three properties mentioned above.

In an embodiment, the mechanical properties of the film of the invention (elastic modulus, elongation at break, tensile strength) are balanced in the longitudinal and transverse direction. The balance of the mechanical properties provides for a film that, in the packaging step, does not generate defects such as film breaking or tearing, and unclear cutting.

Thus, in an embodiment, the ratio between the elastic moduli measured in LD and in TD ranges at most of ±25% with respect to the unit. Preferably, this ratio ranges at most of ±20%. This means that the value of the elastic modulus measured in one direction can be higher or lower than the value of the elastic modulus measured in the other direction by at most 25% (preferably at most 20%).

In an embodiment, the ratio between the elongations at break measured in LD and in TD ranges at most of ±25% with respect to the unit. Preferably, this ratio is at most ±20% This means that the value of the elongation at break measured in one direction can be higher or lower than the value of the elongation at break measured in the other direction by at most 25% (preferably at most 20%).

In an embodiment, the ratio between the tensile strengths at break measured in LD and in TD ranges at most of ±25% with respect to the unit. Preferably, this ratio ranges at most of ±20% This means that the value of the tensile at break measured in one direction can be higher or lower than the value of the tensile strength at break measured in the other direction by at most 25% (preferably at most 20%).

In an embodiment, all the ratios depicted above, namely the ratio between the elastic moduli, the ratio between the elongations at break, and the ratio between the tensile strengths at break, respectively measured in LD and in TD, range at most of ±25%, preferably at most of ±20% with respect to the unit.

Generally, for the films of the invention having a free shrink lower than 15%, it is preferable that the values of the elastic modulus, and/or of the elongation at break, and/or of the tensile strength at break measured in LD and TD are such as to result in a LD/TD ratio higher than one. This ratio of mechanics helps to minimize the tray distortion effect of the films, when used as lids in tray lidding application, particularly on rectangular trays.

The maximum shrink tension of a film represents the maximum value of tension developed by the clamped film samples when subjected to a heating-cooling cycle according to the following test method.

Specimens of the films (2.54 cm×14.0 cm, of which 10 cm are free for testing) are cut in the longitudinal (LD) and transverse (TD) directions of the film and clamped between two jaws, one of which is connected to a load cell. The two jaws keep the specimen in the center of a channel into which an impeller blows hot or cold air and two thermocouples measure the temperature. The thermocouples are positioned as close as possible (less than 3 mm) to the specimen and in the middle of the same. The signals produced by the thermocouples (which is the testing temperature) and by the load cell (which is the force) are sent to a computer where the software records these signals. The impeller starts blowing hot air and the force exerted by the sample is recorded in grams. The temperature is increased from 23° C. to 90° C.

or 180° C. at a rate of about 3.2° C./second by blowing hot air and then decreased from 90° C. or 180°, respectively, to 5° C. at a rate of 0.9° C./second by blowing cold air. The maximum shrink tension is calculated by dividing the maximum force value in kg (force at peak) by the specimen width (expressed in cm) and by the specimen average thickness (expressed in cm). The maximum shrink tension is thus expressed as kg/cm². The selection of the maximum temperature reached during the test (90° C. or 180° C.) depends upon the shrink properties of the film and must be decided for each single case based on the temperature at which the film starts to shrink. Typically, for the films of the present invention having a free shrink lower than 15% in both LD and TD, measured at 120° C. in oil according to ASTM D2732, the maximum shrink tension, measured according to the method of the present description, is not higher than 25 kg/cm² both in LD and in TD, preferably not higher than 21 kg/cm², more preferably not higher than 17 kg/cm².

For the films of the present invention having a free shrink higher than 20% in both LD and TD, measured at 85° C. in water according to ASTM D2732, or higher than 15%, preferably comprised between 15% and 60%, more preferably comprised between 20% and 40% in both LD and TD, measured at 120° C. in oil according to ASTM D2732, the maximum shrink tension in both LD and in TD, measured according to the method of the present description, is not higher than 35 kg/cm², or not higher than 30 kg/cm², preferably not higher than 25 kg/cm².

The film of the present invention can advantageously comprise an antifog agent, so that a film endowed with antifog properties is obtained. Antifog films are particularly useful for packaging moisture producing or respiring food products. In the presence of the anti-fog agent, the moisture coming from the packaged products condensates on the surface of the film facing the product forming a uniform layer or few very large uniform areas. Anyway, no fog appears on the surface of the film, resulting in good see-through properties and in the possibility to visually inspect the packaged product.

In one embodiment, the antifog agent can be applied to at least the surface of the heat sealant layer a) in the form of a coating. Antifog coatings are well known in the art and can be applied in various ways (spraying, rotogravure, etc) with or without previously treating the surface by corona treatments. In another, preferred, embodiment, the antifog agent is coextruded in at least the heat sealant layer a) of the film. The total amount of antifog agent(s) in layer a) is typically comprised between 0.1 wt % and 5 wt % with respect to the total weight of layer a), preferably between 0.2 wt % and 3 wt %, more preferably between 0.3% and 2 wt %.

Antifog agents are known in the art and mainly fall into classes such as: esters of aliphatic alcohols, polyethers, polyhydric alcohols, esters of polyhydric aliphatic alcohols, poly-ethoxylated aromatic alcohols, polyhydric alcohol fatty acid esters, hydrophilic fatty acid esters, polyethoxylated aromatic alcohols, nonionic ethoxylates, higher fatty acid amines, higher fatty acid amides, polyoxyethylene ethers of higher fatty alcohols and ethylene oxide adducts of higher fatty acid amines or amides. Examples of antifog agents are polyoxyethylene, sorbitan monostearate, polyoxyethylene sorbitan monolaurate, polyoxyethylene monopalmitate, polyoxyethylene sorbitan tristearate, polyoxyethylene sorbitantrioleate, poly(oxypropylene), polyethoxylated fatty alcohols, polyoxyethylated 4-nonylphenol, polyhydric alcohol, propylene diol, propylene triol, ethylene diol, monoglyceride esters of vegetable oil or animal fat, mono- and/or diglycerides such as glycerol mono- and dioleate, glyceryl stearate, monophenyl polyethoxylated, sorbitan monolaurate, and the like.

Other examples of antifog agents are ethoxylated sorbitan derivatives with higher fatty acids such as those marketed under the trade name of Tweens or polysorbates, preferably with fatty acids from C14 to C24, for example Atmer 116 commercialized by Croda.

In an embodiment, the antifog agent(s), the one or more polyolefins and, if present, the EVA, the ethylene(meth) acrylate/(meth)acrylic acid copolymers and/or the ethylene butyl acrylate (EBA) of layer a) can be mixed to form a masterbatch to be supplied to the extruder, the polyolefins and, if present, the EVA, the ethylene(meth)acrylate/(meth) acrylic acid copolymer(s) and the EBA working as the carrier resin for the antifog agent(s).

For example, AF5841LL 1.5 Percent Sylobloc 47 As AB from Tosaf, wherein the carrier resin is LLDPE, may be used as a suitable antifog masterbatch.

Preferably, in order to improve the machinability and the processing of the film of the invention in a high-speed packaging equipment, slip and/or anti-blocking additives may be added, preferably to one or both of the outer heat-sealable layer a) and/or outer layer c). These additives may advantageously be added in the form of a concentrate in a polyolefin carrier resin, thus forming a masterbatch. The amount of masterbatch is typically in the order of 0.1-5% of the total weight of the layer. For example, Conpol 10AF from DuPont may be used as a suitable masterbatch.

Additionally, nucleating agents may also be added, preferably to one or both of the outer heat-sealable layer a) and/or outer layer c). The nucleating agents provide nucleation sites for crystal growth during cooling of a polymer from molten state. Thus, the addition of nucleating agents in semicrystalline thermoplastic polymers enhances the mechanical properties, such as the thermal resistance, increases the crystallization temperature and improves clarity of the resulting film. Thus, nucleating agents may advantageously be added, preferably at least in the outer layer c), to increase the thermal resistance of the film of the invention during the sealing. Suitable nucleating agents for the film of the present invention are NA11, from Amfine Chemical Corporation; Cesa series, from Clariant; Colormatrix NuAge, from Polyone. Also the nucleating agents may advantageously be added in the form of a concentrate in a polyolefin carrier resin, thus forming a masterbatch. The amount of masterbatch is typically in the order of 0.1-5% by weight of the total weight of the layer and, usually, the carrier resin constitutes 50 to 90% by weight of the masterbatch.

The film of the present invention is biaxially oriented, with an orientation ratio, in both the longitudinal direction and the transverse direction, comprised between 2.5:1 and 6:1, preferably comprised between 3:1 and 5.5:1.

In order to favor adhesion between the barrier layer b) and the outer skin layer c) and between the barrier layer b) and the heat sealant layer a) or, if present, an inner layer d), tie (adhesive) layers e) can be present. Such tie layers e) are typically made of anhydride modified polyolefins, preferably maleic anhydride modified polyolefins.

Examples of suitable anhydride modified polyolefins are the products commercialized under the tradenames ADMER QF551E and ADMER NF927E by Mitsui Chemical.

Accordingly, at least one tie layer e) made of anhydride modified polyolefins may be present in the film of the invention, preferably maleic anhydride modified polyolefins. Preferably, at least two tie layers e) made of anhydride modified polyolefins can be present, one between the barrier layer b) and the outer skin layer c) or, if present, an inner layer d), and one between the barrier layer b) and the heat-sealant layer a) or, if present, an inner layer d).

Advantageously, the anhydride modified polyolefins working as tie resin can be selected in accordance with the polyolefins present in the other layers of the film, to maximize the recyclability of the film in the appropriate stream. Thus, if the film comprises both an outer heat sealant layer a) and an outer layer c) consisting essentially of polyethylene polymers, anhydride modified polyethylenes can advantageously be selected as the polymers of the tie layers. Accordingly, the resulting film may be disposed of in the RIC4 recycling stream.

Similarly, if the film comprises both an outer heat sealant layer a) and an outer layer c) consisting essentially of polypropylene polymers, anhydride modified polypropylenes can advantageously be selected as the polymers of the tie layers. Accordingly, the resulting film may be disposed of in the RIC5 recycling stream.

The film of the invention comprises at least three layers and, preferably, at most nine layers.

The film of the invention preferably comprises from four to seven layers.

In one embodiment, the layers sequence of the film can be a/b/c.

In another embodiment, the layers sequence can be a/e/b/e/c.

In another embodiment, the layers sequence can be a/d/b/c.

In another embodiment, the layers sequence can be a/d/e/b/e/c.

In another embodiment, the layers sequence can be a/d/b/e/c.

In another embodiment, the layers sequence can be a/d/e/b/c.

In another embodiment, the layers sequence can be a/d/b/d/c.

In another embodiment, the layers sequence can be a/d/d/e/b/e/c.

In another embodiment, the layers sequence can be a/d/b/e/d/c.

In another embodiment, the layers sequence can be a/d/e/b/e/d/c.

In a particularly preferred embodiment, the film of the invention has the following layer composition:
1. heat-sealant layer a): 100 wt % ethylene-propylene (EP) copolymer, (or preferably 70 wt % ethylene-propylene (EP) copolymer and 30 wt % of antifog masterbatch with PP as carrier polymer);
2. optional inner layer d): 100 wt % polypropylene
3. tie layer e): 100 wt % maleic anhydride modified polypropylene
4. barrier layer b): 100 wt % EVOH
5. tie layer e): 100 wt % maleic anhydride modified polypropylene
6. optional inner layer d): 100 wt % polypropylene
7. outer skin layer c): 100 wt % polypropylene (or, preferably, 98% polypropylene and 2% of a slip and antiblock masterbatch with PP as carrier polymer).

In another particularly preferred embodiment, the film of the invention has the following layer composition:
1. heat-sealant layer a): 100 wt % metallocene polyethylene (or preferably 70 wt % anhydride modified polyethylene and 30 wt % of antifog masterbatch with PE as carrier polymer);
2. optional inner layer d): 100 wt % polyethylene 3. tie layer e): 100 wt % maleic anhydride modified polyethylene
4. barrier layer b): 100 wt % EVOH
5. tie layer e): 100 wt % maleic anhydride modified polyethylene
6. optional inner layer d): 100 wt % polyethylene
7. outer skin layer c): 100 wt % polyethylene (or, preferably, 98% polyethylene and 2% of a slip and antiblock masterbatch with PE as carrier polymer).

In another particularly preferred embodiment, the film of the invention has the following layer composition:
1. heat-sealant layer a): 100 wt % ethylene-propylene (EP) copolymer, (or preferably 70 wt % ethylene-propylene (EP) copolymer and 30 wt % of antifog masterbatch with PP as carrier polymer);
2. easy opening inner layer d): 10-40 wt % EVA, 40-80 wt % ionomer, 5-30 wt % polybutylene
3. optional inner layer d): 100 wt % polypropylene
4. tie layer e): 100 wt % maleic anhydride modified polypropylene
5. barrier layer b): 100 wt % EVOH
6. tie layer e): 100 wt % maleic anhydride modified polypropylene
7. optional inner layer d): 100 wt % polypropylene
8. outer skin layer c): 100 wt % polypropylene (or, preferably, 98% polypropylene and 2% of a slip and antiblock masterbatch with PP as carrier polymer).

In another particularly preferred embodiment, the film of the invention has the following layer composition:
1. heat-sealant layer a): 100 wt % metallocene polyethylene (or preferably 70 wt % modified polyethylene and 30 wt % of antifog masterbatch with PE as carrier polymer);
2. easy opening inner layer d): 10-40 wt % EVA, 40-80 wt % ionomer, 5-30 wt % polybutylene
3. optional inner layer d): 100 wt % polyethylene
4. tie layer e): 100 wt % maleic anhydride modified polyethylene
5. barrier layer b): 100 wt % EVOH
6. tie layer e): 100 wt % maleic anhydride modified polyethylene
7. optional inner layer d): 100 wt % polyethylene
8. outer skin layer c): 100 wt % polyethylene (or, preferably, 98% polyethylene and 2% of a slip and antiblock masterbatch with PE as carrier polymer).

In another particularly preferred embodiment, the film of the invention has the following layer composition:
1. heat sealant layer: 100% wt % EVA or EMA or EBA or EP or modified ethylene acrylate
2. inner layer d): 100 wt % polypropylene
3. tie layer e): 100 wt % maleic anhydride modified polypropylene
4. barrier layer b): 100 wt % EVOH
5. tie layer e): 100 wt % maleic anhydride modified polypropylene
6. outer skin layer c): 100 wt % polypropylene (or, preferably, 98% polypropylene and 2% of a slip and antiblock masterbatch with PP as carrier polymer).

In this embodiment, the modified ethylene acrylate is preferably a resin of the series Appeel marketed by Dow.

In another particularly preferred embodiment, the film of the invention has the following layer composition:
1. heat sealant layer: 100% wt % EVA or EMA or EBA or EP or modified ethylene acrylate
2. inner layer d): 100 wt % polyethylene
3. tie layer e): 100 wt % maleic anhydride modified polyethylene 4. barrier layer b): 100 wt % EVOH 5. tie layer e): 100 wt % maleic anhydride modified polyethylene 6. outer skin layer c): 100 wt % polyethylene (or, preferably, 98% polyethylene and 2% of a slip and anti-block masterbatch with PE as carrier polymer).

In this embodiment, the modified ethylene acrylate is preferably a resin of the series Appeel marketed by Dow.

In another particularly preferred embodiment, the film of the invention has the following layer composition:

1. heat-sealant layer a): 100 wt % propylene, ethylene and butene copolymer, (or preferably 90 wt % propylene, ethylene and butene copolymer and 10 wt % of anti-block and slip masterbatch with a propylene/ethylene copolymer as carrier);

2. inner layer d): 100 wt % copolymer of propylene and ethylene 3. tie layer e): 100 wt % maleic anhydride modified polypropylene 4. barrier layer b): 100 wt % EVOH 5. tie layer e): 100 wt % maleic anhydride modified polypropylene 6. inner layer d): 100 wt % copolymer of propylene and ethylene 7. outer skin layer c): 100 wt % polypropylene (or, preferably, 90% polypropylene and 10% of a slip and antiblock masterbatch with PP as carrier).

In another particularly preferred embodiment, the film of the invention has the following layer composition:

1. heat-sealant layer a): 100% wt % EVA or EMA or EBA or EP or modified ethylene acrylate (or preferably 80 wt % EVA or EMA or EBA or EP or modified ethylene acrylate and 20 wt % of antiblock and slip masterbatch with an ethylene copolymer as carrier)

2. inner layer d): 100 wt % copolymer of propylene and ethylene 3. tie layer e): 100 wt % maleic anhydride modified polypropylene 4. barrier layer b): 100 wt % EVOH 5. tie layer e): 100 wt % maleic anhydride modified polypropylene 6. inner layer d): 100 wt % copolymer of propylene and ethylene 7. outer skin layer c): 100 wt % polypropylene (or, preferably, 90% polypropylene and 10% of a slip and antiblock masterbatch with PP as carrier).

In this embodiment, the modified ethylene acrylate is preferably a resin of the series Appeel marketed by Dow.

In another particularly preferred embodiment, the film of the invention has the following layer composition:

1. heat sealant layer a): 100% LLDPE (or preferably 75 wt % LLDPE and 25 wt % of antifog and antiblock masterbatch with LLDPE as carrier)

2. inner layer d): 100% LLDPE 3. tie layer e): 100 wt % maleic anhydride modified LLDPE 4. barrier layer b): 100 wt % EVOH 5. tie layer e): 100 wt % maleic anhydride modified LLDPE 6. inner layer d): 100% LLDPE 7. outer skin layer c): 100% LLDPE (or preferably 75 wt % LLDPE and 25 wt % of antifog and antiblock masterbatch with LLDPE as carrier).

In this embodiment, preferably:

the LLDPE of the heat sealant layer a) and of the outer skin layer c) can be a blend of SUPEER 7318 BE, SUPEER 7118 NE (both manufactured by Sabic), Eltex PF6220AA manufactured by INEOS Olefins & polymers Europe and, if an antifog and antiblock masterbatch with LLDPE as carrier is present, it can preferably be AF5841LL, manufactured by Tosaf;

the LLDPE of the inner layers d) can be a blend of SUPEER 7318 BE, SUPEER 7118 NE (both manufactured by Sabic) and Eltex PF6220AA, manufactured by INEOS Olefins & polymers Europe;

the maleic anhydride modified LLDPE of the tie layers e) can be ADMER NF927E, manufactured by Mitsui Chemical; and the EVOH of the barrier layer b) can be G-Soarnol GH3804B, manufactured by MCPP Mitsubishi Chemical Corporation;

The film of this embodiment is preferably cross-linked, preferably by electron beam irradiation, with a radiation dosage preferably from 20 to 40 kGy, more preferably of 37 kGy.

The film of this embodiment may preferably have a thickness comprised between about 15 and about 50 microns, more preferably between about 20 and about 40 microns, even more preferably between about 22 and about 35 microns, still more preferably the thickness may be about 21.10 microns or about 25 microns.

In this embodiment, the thickness of each layer can preferably be the following:

heat sealant layer a): comprised between about 4 microns and about 8 microns, preferably between about 5 microns and about 7 microns, more preferably of about 5 microns or about 7 microns;

inner layers d): comprised between about 1 micron and about 3 microns, preferably of about 2 microns or of about 2.2 microns;

tie layers e): comprised between about 1 micron and about 4 microns, preferably of about 2.5 microns;

barrier layer b): comprised between about 1 micron and about 3 microns, more preferably of about 1.7 microns or of about 2 microns;

outer skin layer c): comprised between about 4 microns and about 8 microns, preferably between about 5 microns and about 7 microns, more preferably it can be about 5 microns or about 7 microns;

In this embodiment, the thickness ratio of each layer in respect to the total film thickness may preferably be the following:

heat sealant layer a): comprised between 16% and 38%, preferably between 20% and 33%, more preferably about 24% or about 28%;

inner layers d): comprised between 4% and 14%, preferably between 6% and 12%, more preferably it can be about 8% or about 10.5%;

tie layers e): comprised between 6% and 16%, preferably between 8% and 14%, more preferably it can be about 10% or about 12%;

barrier layer b): comprised between 4% and 14%, preferably between 7% and 10%, more preferably it can be about 8%;

outer skin layer c): comprised between 16% and 38%, preferably between 20% and 33%, more preferably about 24% or about 28%.

It is particularly preferred that the film of this embodiment has a thickness of about 25 microns, wherein the thickness of the heat sealant layer a) is about 7 microns, the thickness of each inner layer d) is about 2 microns, the thickness of each tie layer e) is about 2.5 microns, the thickness of the barrier layer b) is about 2 microns and the thickness of the outer skin layer c) is about 7 microns.

It is also particularly preferred that the film of this embodiment has a thickness of about 21.10 microns, wherein the thickness of the heat sealant layer a) is about 5 microns, the thickness of each inner layer d) is about 2.2 microns, the thickness of each tie layer e) is about 2.5 microns, the thickness of the barrier layer b) is about 1.7 microns and the thickness of the outer skin layer c) is about 5 microns. Preferably, the overall composition of the film of the invention comprises at least 60%, preferably at least 70%, more preferably at least 80%, even more preferably at least 90% by weight of one or more polyolefins based on the total weight of the film. By properly selecting the same polyolefins to manufacture the various layers, a film as much close as possible to a "mono material" can easily be obtained, which can satisfy the requirement for recycling in the polyolefin streams (namely, RIC4 or RIC5).

The film of the invention has good optical properties in terms of haze (measured according to ASTM D1003) and gloss (ASTM D2457). Good optical properties are a desirable characteristic for packaging films because allow the visual inspection of the packaged product. Typically, the films of the invention have haze not higher than 15%, preferable lower than 10%, more preferably lower than 5%. The films of the invention may have gloss values at 60° not lower than 90 g.u., preferably higher than 100 g.u., more preferably higher than 110 g.u.

In addition, the film of the invention has good sealant properties and seal strength. When used as a lid for a support, typically a tray, the film of the invention can easily be sealed onto PET supports, preferably APET support, PE supports, PP supports. Similarly, the film of the invention can be sealed on supports having a PET, preferably APET, a PE, or a PP liner on the sealing surface of the support. The sealing temperatures typically are comprised between 100° C. and 170° C.

Alternatively, the film of the invention can also be sealed upon itself—both contacting two portions of the heat-sealable layer a) and contacting a portion of the heat-sealable layer a) and a portion of the outer layer c)—to form flexible containers, as will be described below.

The total thickness of the films of the invention may vary within wide limits, depending on the intended packaging application. Typically, it is comprised between 4 and 120 microns. In one embodiment, preferably when the films of the invention are used as lids applied to supports or containers or as wrapping films, the total thickness of the films is lower than 80, 70, 60 or 50 microns, preferably may be comprised between 15 and 50 microns, more preferably between 20 and 40 microns, even more preferably between 25 and 35 microns. In another embodiment, preferably when the films of the invention are thermoformed in the shape of supports or containers, the total thickness of the films may be comprised between 80 and 120 microns.

One or more of the following partial thicknesses, taken alone or in combinations, characterize the present film.

In an embodiment, the heat sealable layer a) of the present film can have a thickness comprised between 1 and 20 microns, preferably between 1 and 10 microns, more preferably between 3 and 8 microns.

In an embodiment, the inner barrier layer b) of the present film can have a thickness comprised between 1 and 15 microns, preferably between 1 and 10 microns, more preferably between 1 and 8 microns.

In an embodiment, the outer layer c) of the present film can have a thickness comprised between 2 and 40 microns, preferably between 2 and 20 microns, more preferably between 3 and 15 microns, even more preferably between 4 and 10 microns.

The film according to the present invention can optionally be crosslinked.

In a preferred embodiment, the film of the present invention is not crosslinked. As it is known in the art, crosslinking negatively affects recyclability of the materials, thus in order to have films which can fully fulfil the recycling requirements of RIC4 or RIC5, the films should not be crosslinked.

Advantageously, triple bubble technology allows imparting the desired properties to the film without necessarily resorting to cross-linking.

In another preferred embodiment, the film of the present invention is crosslinked. In case crosslinked films need to be manufactured, crosslinking can be done by chemical crosslinking, electronic crosslinking (either with low or high radiation method) or by a combination thereof. The preferred method of crosslinking is electronic crosslinking by electron beam irradiation and it is well known in the art. One skilled in the art can readily determine the radiation exposure level suitable for the application of the film. Preferably, however, radiation dosages of up to about 45 kGy are applied, more preferably from 20 to 40 kGy, even more preferably from 25 to 35 kGy.

A low degree of crosslinking (which is obtained by using low radiation dosages) is preferred in order to increase the recyclability of the films.

Among the crosslinked films of the invention, films comprising at least 60%, preferably at least 70%, even more preferably at least 80% by weight, based on the total weight of the film, of polyethylene, are preferred.

The biaxially oriented film according to the present invention is coextruded.

The inventors of the present invention have surprisingly found that the film according to the invention can be manufactured through a Triple Bubble co-extrusion line, equipped with some particular accessories.

The conventional Triple Bubble technique and the co-extrusion process are well known in the art and are widely described in both patent and non-patent literature. For example, WO 2010/094308 (in the name of Kuhne) and EP 1296830 (in the name of Kureha) describe in detail the Triple Bubble technique and line.

In short, in the conventional Triple Bubble process the following steps are performed:

i) Co-Extrusion

First, the melted thermoplastic polymers forming the various layers of the film are co-extruded through a round extrusion die, that allows shaping the melted polymers into a film tube, wherein each of the polymers of the layers of the film are extruded simultaneously through the extrusion die. In this way, a co-extruded multilayer tube is formed, which corresponds to the "first bubble". The co-extruded multilayer tube then is quenched with water without being expanded, to a temperature below the lowest melting point of the thermoplastic polymers and is passed through the deflate rolls. It is important that the tube is quenched within a short time in order to "freeze" the polymers in their amorphous state. In fact, only amorphous polymers can successively undergo orientation, while it is impossible to orient polymers in their crystalline state.

ii) Orientation

The multilayer tube is first pre-heated to a temperature which is above the Tg (Glass Transition temperature) of all the polymers employed and below the Tm (Melting temperature) of most (preferably all) of the polymers employed, by means of pre-heating. The pre-heated tube then enters the heating orientation oven(s), where, still at this temperature, it is at the same time expanded by internal air pressure to provide the transverse orientation and pulled by a differential speed of the pinch rolls that hold the tube, to provide the longitudinal orientation. During this step, by properly operating on the air pressure and on the speed of the pinch rolls, it is possible to obtain the desired stretch ratio in the longitudinal direction and the transverse direction.

This expanded tube corresponds to the "Second Bubble". An equipment suitable for this technique is disclosed for example in U.S. Pat. No. 4,841,605.

Both the pre-heating ovens and the heating orientation oven(s) are tubular ovens containing infrared radiation (IR) emitting ceramic elements.

The ceramic elements of these prior pre-heating and heating elements emit infrared (IR) radiation at a wavelength typically comprised between 1000 cm$^{-1}$ and 2200 cm$^{-1}$. These wavelengths are absorbed directly by polyester and polyamide materials, which are generally present in the outer layers of the prior films manufactured by triple bubble, which thus are heated by direct irradiation. Typically, the other layers of a film are heated in an indirect manner, by conduction, i.e. they are heated by the heating of the external, IR absorbing, polyamide or polyester layers, or by convection, i.e. thermal exchange with the hot air inside the ovens. Thus, it is generally necessary that at least 40 wt % of the polymers of a film are polyesters and/or polyamides, because these polymers are heated directly by irradiation by the IR ovens. Other polymers, in particular polyethylene, can be heated only by conduction or convection because do not absorb the IR radiation in the range between 1000 cm$^{-1}$ and 2200 cm$^{-1}$.

The oriented tube is then quenched, as quickly as possible, through a series of air rings, which blow cool air, typically at a temperature of 15° C., passes through a series of deflate rolls and is lay-flattened.

iii) Annealing (or Heat-Setting)

The annealing (or heat-setting) step is a controlled heating-cooling treatment that is aimed at modulating the shrink and shrink tension properties of the resulting film and at having a better control on the low temperature dimensional stability of the film.

First, the oriented, lay-flattened tube is passed through a bath of water, generally at a temperature between 40° C. and 60° C. This hot bath serves to stabilize the film structure by removing the internal tensions generated during the orientation step and reduces the curl effect in case of films having a high orientation ratio in both longitudinal direction and transverse direction.

Then, the tube is blown again by pulling it by means of pinch rolls while at the same time blowing air in the tube to form the Third Bubble (or annealing bubble). This bubble is blown but is not further expanded thus the dimension of the tube remains the same, both in LD and TD. While the Third Bubble is blown, the tube is heated to a temperature generally comprised between 60° C. and 150° C. by means of air ovens or IR ovens, analogous to the orientation IR oven.

The Third bubble is then deflated by passing the blown tube through a series of deflate rolls, which lay flatten the tube. The lay-flattened tube is finally wound up in rolls and sent to converting.

Up to now, conventional Triple Bubble technique has always been employed for manufacturing films comprising a large amount of "stiff" resins, in particular comprising at least 40% of polyesters and/or polyamides. The reason for this is the fact that, as explained above, these resins effectively absorb the wavelength of the IR radiation emitted by the ceramic elements of the IR ovens, thus mainly contributing to the heating of the film. In addition, stiff resins result in films having a high tensile strength, which contributes to the stability of the second bubble during orientation and of the third bubble during annealing.

The present inventors have surprisingly been able to manufacture the film of the invention, which has a total polyolefin content greater than 60 wt %, through a Triple Bubble process, by bringing some changes to the manufacturing line.

As stated above, one of the issues of Triple Bubble process is the possibility to heat the film by using IR ovens, which are effective in heating polyester films and polyamide films but which do not heat polyolefin films.

The inventors have solved this problem by introducing ceramic elements, which emit IR radiations at a wavelength matching the absorbance wavelength of polyolefins in the IR pre-heating ovens and in the heating orientation oven(s), which heat the tubular film before and during the orientation step (second bubble). Consequently, polyolefins, which represent the major components by weight of the film of the invention, absorb the IR radiation and the film is effectively heated by direct irradiation.

Typically, the wavelength of the IR radiation emitted by the IR pre-heating ovens and heating ovens of the process of the invention is comprised between 2500 cm$^{-1}$ and 3000 cm$^{-1}$.

Another issue with the Triple Bubble process is the stability of the bubbles, in particular of the second bubble (orientation bubble). Also in this case, the presence of large amounts of stiff resins such as polyesters and polyamides helps the stability of the bubbles because the resulting films are more rigid and thus more stable while being manufactured. Polyolefin, on the contrary, are soft resins and a bubble of a film made of such resins can hardly be formed because it is not stable.

In this regard, the inventors have found that an additional couple of pinch rolls, placed between the pre-heating IR ovens and the heating orientation IR ovens of the second bubble, may help in obtaining a stable bubble and a correct and balanced orientation of the film.

As can be seen in FIG. 1, the optional additional couple of pinch rolls (4) present in the Triple Bubble line is placed between the tubular pre-heating IR oven (2), and the heating orientation IR oven (3). The pre-heated tube exiting the pre-heating IR oven (2) passes through the optional additional couple of pinch rolls (4) that helps it entering the heating orientation oven(s) (3), where it is blown and stretched. The optional additional couple of pinch rolls (4) may help to stabilize the pre-heated tube and to favor the stability of the bubble (8) by allowing a smooth entrance of the tube in the heating orientation oven(s) (3), where the orientation bubble is formed.

Thus, a further object of the present invention is an improved triple bubble process for manufacturing the multilayer packaging film according to the invention, such process comprising, in order, the steps of:

i) co-extruding through a round die the melted thermoplastic polymers of the film, to form a co-extruded multilayer tube comprising at least layers a), b) and c), ii) cooling the co-extruded multilayer tube, preferably with water, to a temperature below the lowest melting point of the thermoplastic polymers, and passing it through deflate rolls, providing a flat tube (6), iii) moving the tube through a couple of pinch rolls (5) and pre-heating the tube to a temperature comprised between 80° C. and 130° C. through pre-heating ovens (1, 2) emitting infrared radiation (IR), iv) further heating the pre-heated tube to keep its temperature between 80° C. and 130° C. through heating orientation oven(s) (3) emitting infrared radiation (IR), while biaxially orienting the tube by longitudinally pulling it through a couple of deflate rolls and transversally expanding it by blowing a gas in the multilayer tube, with an orientation ratio, in both the longitudinal direction and the transverse direction, comprised between 2.5:1 and 6:1, thus providing a biaxially oriented tube (8), v) cooling the oriented tube (8), preferably at a temperature of 12-18° C. and preferably through air rings, passing it through a series of converging rolls and lay-flattening it, vi) optionally bringing the temperature of the lay flattened film at to 40° C. to 60° C., preferably by passing it through a bath of water, vii) heat-setting the tube by longitudinally lifting it up through a couple of pinch rolls and by blowing a gas in the tube, while heating it at a temperature comprised between 60° C. to 150° C., viii) passing the heat-set tube through a series of converging rolls, lay-flattening it and winding it;

wherein:

in step iii) and step iv) the wavelength of the IR radiation emitted by the pre-heating ovens (1, 2) and by the heating orientation oven(s) (3) matches the absorbance wavelength of the polyolefins, preferably a wavelength from 2500 cm$^{-1}$ to 3000 cm$^{-1}$; and optionally, in step iv) the pre-heated tube (7) passes through an additional couple of pinch rolls (4) positioned between the pre-heating ovens (1, 2) and the heating orientation oven(s) (3).

During the heat-setting step (vii) the tube is relaxed, i.e. some free shrink and shrink tension are removed. Typically, the tube is relaxed to a heat-relaxation ratio comprised between 0% and 15% in both LD and TD.

The heat-relaxation ratio in LD is calculated according to the following formula:

$$[1-(\text{speed of the converging rolls/speed of the pinch rolls})]$$

The heat-relaxation ratio in TD is calculated according to the following formula:

$$[1-(\text{layflat width of the tube entering the converging rolls/layflat width of the tube entering the pinch rolls})]\%.$$

A further object of the present invention is a film obtainable according to the process of the present invention as described above.

A further object of the present invention is a flexible container obtainable by heat-sealing a film according to the invention on itself or by heat-sealing a first and a second film, of which at least the first film is a film according to the invention. In one embodiment, the second film is preferably a polyolefin film, more preferably a polyethylene or a polypropylene film. In such flexible container, the sealant layer of the film(s) of the invention faces the inside of the container and is in contact with the packaged product.

In another embodiment, also the second film is a film according to the invention.

In one embodiment, the film(s) of the invention, which is heat-sealed to form a flexible container is preferably a film having a free shrink higher than 20% in both longitudinal direction (LD) and transverse direction (TD), measured at 85° C. in water according to ASTM D2732 or higher than 15%, preferably comprised between 15% and 60%, more preferably comprised between 20% and 40% in both LD and TD, measured at 120° C. in oil according to ASTM D2732. This results in high shrinkable flexible containers.

In another embodiment, the film(s) of the invention, which is heat-sealed to form a flexible container, is preferably a film having a free shrink lower than 15% in both longitudinal direction (LD) and transverse direction (TD), measured at 120° C. in oil according to ASTM D2732. This results in low shrinkable flexible containers.

Preferably, the flexible container is in the form of a bag or a pouch.

Any conventional method for making bags and pouches known in the art may be readily adapted to make flexible containers from the multilayer film according to the present invention.

A further object of the present invention is a thermoformed support obtainable by thermoforming the multilayer packaging film of the present invention. In such thermoformed support, the sealant layer a) of the film of the invention forms the surface of the support that will come into contact with or face a supported product. The thermoformed support can be rigid or semi-rigid or flexible. Preferably, the thermoformed support can be a container, more preferably it can be a tray. In the thermoformed support of the invention, in which a cavity has been created as a result of thermoforming, the sealing layer a) faces the cavity.

In one embodiment, a thermoformed support is obtainable by thermoforming a film according to the invention having a free shrink higher than 20% in both longitudinal direction (LD) and transverse direction (TD), measured at 85° C. in water according to ASTM D2732, or higher than 15%, preferably comprised between 15% and 60%, more preferably comprised between 20% and 40% in both LD and TD, measured at 120° C. in oil according to ASTM D2732.

In one embodiment, thermoformed support is obtainable by thermoforming a film according to the invention having a free shrink lower than 15% in both longitudinal direction (LD) and transverse direction (TD), measured at 120° C. in oil according to ASTM D2732.

Thermoforming is well known in the art, for example, it is described in Modern Plastic Encyclopedia, 1984-1985, at pages 329-336.

In thermoforming, in general, a film in the form of a flat sheet is heated until the thermoplastic material is sufficiently softened and then placed over a mould, typically made of aluminum. The heated film is then forced towards the surface of the mould by vacuum, air pressure and/or direct mechanical force, so that it assumes the shape of the mould. The film is then cooled while being held against the mould and thus originates a thermoformed shaped product, which is ejected from the mould.

A further object of the present invention is a package comprising the multilayer packaging film or the flexible container and/or the thermoformed support, according to the invention, and a product packaged therein. The package of the present invention can comprise a multilayer packaging film or a flexible container and a thermoformed support according to the invention.

In a first embodiment, the package of the present invention is a lidded package comprising a support, a product placed onto the support, and a lid made of the multilayer packaging film of the present invention (lidding film). In such lidded package, the sealant layer a) of the film is in contact with, or faces, the product. The film is hermetically sealed all around onto said support, thus enclosing the product.

In such lidded package, the lidding film is preferably a film of the invention having a free shrink lower than 15% in both longitudinal direction (LD) and transverse direction (TD), measured at 120° C. in oil according to ASTM D2732. This film is endowed with a free shrink sufficiently low not to cause tray distortion when the lidding film shrinks after sealing on the tray.

In a preferred embodiment, the support is a container, more preferably a tray. In this case (i.e. the so-called "tray lidding" applications), the film is sealed onto a continuous peripheral rim extending all around the container. The support, preferably the container, more preferably the tray, is typically rigid or semi-rigid.

Typically, the support, or at least the surface of the support in contact with the product and involved in the formation of the seal with the lidding film of the invention, consists, or consist essentially of polypropylene (PP), polyethylene (PE) or a polyester resin such as PET, usually an amorphous polyester resin (APET) or a crystalline polyester resin (CPET), or APET/CPET, either foamed or not-foamed, i.e. solid. The support can also be made of cardboard, or of resins even different from those listed above, having a liner consisting, or consisting essentially of a resin such as PP, PE, PET, APET, CPET, or APET/CPET on the surface of the support involved in the formation of the seal with the lidding film.

The lidded package according to the invention is produced by techniques well known to those skilled in the art.

For example, once the food to be packaged has been placed on the support, or in the container, the film according to the invention is placed on the support or container such that its sealant layer is in contact with the surface of the support or with the rim or the peripheral lip/flange of the container. The film is then sealed to the support by means of temperature and/or pressure using conventional techniques and equipment.

Sealing is generally carried out by means of a heated frame at temperatures of from 100° C. to 180° C., preferably from 110° C. to 160° C., more preferably from 120° C. to 150° C., at a pressure of 2 to 10 bar, preferably 4 to 8 bar. Sealing times are typically in the order of 0.3 to 2.0 seconds, 0.5 to 1.0 seconds. For example, the support with the product loaded therein is brought into a lid sealing station, which comprises a lower chamber and an upper chamber, and a web of the film of the invention is provided over the top of the support. The lower chamber and the upper chamber are then closed together, the air in-between the support and the lidding film is optionally replaced by a suitable gas or gas admixture, with or without prior air evacuation, and then the lidding film of the invention is sealed to the surface of the support or to the rim or the peripheral lip/flange of the container by means of the combination of a heated frame or plate above the lidding film and a similarly framed anvil supporting the support, that are pressed together. The lidding film is cut almost at the same time as the lid is sealed and, in case of shrinkable lids, shrinkage of the lid in the package which typically occurs at the same time as the heat of the sealing elements in the lidding station is sufficient to get the desired shrinkage. However, a further heat-shrinking step may be added in case of need.

Lidding machines that can be suitable for tray lidding process include for instance Proseal GTO Tooling 1218 OC, Multivac 400 and Multivac T550 by Multivac Sep. GmbH, Mondini Trave, E380, E390 or E590 by Mondini S.p.A., Ross A20 or Ross S45 by Ross-Reiser, Mecaplastic 1000, Meca-2002 or Meca-2003 by Mecaplastic, the tray lidding machines of Sealpac and similar machines.

The optional replacement of air by a suitable gas or gas admixture (Modified Atmosphere Packaging, MAP) is performed depending on the specific needs of the product to be packaged and typically is used for products like fruits and vegetables, fresh meat, processed meat.

In one embodiment, the package of the present invention is a flexible package comprising the flexible container according to the invention that encloses a product. Optionally, the product can be placed on a rigid or semi-rigid support, preferably in a rigid or semi-rigid container.

For example, the flexible container may be a shrinkable bag made of the film of the invention; in packaging, the product is loaded into such bag, the bag is generally evacuated, and the open end thereof is closed by heat-sealing or by applying a clip, e.g. of metal. This process is advantageously carried out within a vacuum chamber where the evacuation and application of the clip or heat seal is done automatically. After the bag is removed from the chamber, it can be heat shrunk by applying heat. This can be done, for instance, by immersing the filled bag into a hot water bath or conveying it through a hot water shower or a hot air tunnel, or by infrared radiation. The heat treatment produces a tight wrapping that will closely conform to the contour of the product packaged therein.

Still as stated in connection with the invention, when the flexible package further comprises a rigid or semi-rigid container, the flexible container is preferably made with a film of the invention having a free shrink lower than 15% in both longitudinal direction (LD) and transverse direction (TD), measured at 120° C. in oil according to ASTM D2732.

When instead the flexible package does not comprise any rigid or semi-rigid container or support, a higher shrinkage of the flexible container is desired, so that it tightly adheres to the product to be packaged. In this latter case, the flexible container is preferably made with a film of the invention having a free shrink higher than 20% in both longitudinal direction (LD) and transverse direction (TD), measured at 85° C. in water according to ASTM D2732 or higher than 15%, preferably comprised between 15% and 60%, more preferably comprised between 20% and 40% in both LD and TD, measured at 120° C. in oil according to ASTM D2732.

In one embodiment, the package of the present invention is an overwrapped package.

In a first embodiment of the overwrapped package, the package comprises a product and a film according to the invention wrapped around the product.

In this type of overwrapped package, the overwrapping film is a film of the invention preferably having a free shrink higher than 20% in both longitudinal direction (LD) and transverse direction (TD), measured at 85° C. in water according to ASTM D2732 or higher than 15%, preferably comprised between 15% and 60%, more preferably comprised between 20% and 40% in both LD and TD, measured at 120° C. in oil according to ASTM D2732. The high shrink of such film allows for a good adhesion of the film to the packaged product after shrinkage of the film. Such overwrapped package is typically used for packaging portions of cheese, processed meat, salami, etc. In such overwrapped package, the sealant layer a) of the film of the invention is in contact with the product.

In a second embodiment of the overwrapped package, the package comprises a rigid or semi-rigid support, preferably a container, a product placed onto said support or into said container and a film according to the invention wrapped around both the support and the product.

In this type of overwrapped package, the overwrapping film is a film of the invention preferably having a free shrink lower than 15% in both longitudinal direction (LD) and transverse direction (TD), measured at 120° C. in oil according to ASTM D2732. This film is endowed with a free shrink sufficiently low not to cause support distortion when the overwrapping film shrinks after being wrapped around the support and the product.

In such overwrapped package, the sealant layer a) of the film of the invention is in contact with, or faces, the product and the support.

Preferably, the overwrapped package according to the invention is hermetic. In such overwrapped hermetic package, the film of the invention is sealed to itself. Preferably, the film in said overwrapped hermetic package is sealed to itself along one longitudinal seal and two transverse seals, to give a pouch.

The overwrapped hermetic package according to the invention can be produced by techniques well known to those skilled in the art, for example through Horizontal Form Fill Seal (HFFS) or Vertical Form Fill Seal (VFFS) machines.

For instance, an overwrapped hermetic package can be obtained by a flowpack packaging method by means of a Horizontal Form-Fill-Seal (HFFS) machine. Such method conventionally comprises:

a) providing the film according to the present invention, b) running the film through a former thus forming a tube, c) inserting a product, optionally placed in a container or onto a support, into the tube, d) sealing the tube longitudinally, e) sealing and cutting the tube transversally at the beginning and at the end of the package, optionally gasflushing or vacuumizing the tube before closing it, and f) optionally, heat shrinking the package.

In detail, in a flowpack packaging method the product, optionally onto a support or in a container like a tray, is wrapped into an envelope made from a film of the present invention, preferably under a suitable and predetermined atmosphere. To create the envelope, the flat film is first folded around a former and longitudinally sealed to form a tube. The container with the product is placed in such a tube where the leading edge has been closed and gas flushed with the suitably selected gas or gas mixture. The excess gas is generally removed by a gentle pressure on top of the package and the open end of the envelope is then sealed and the package separated from the tubing. In case of a shrinkable film, the loose package is then passed into a shrink tunnel, typically a hot air one set at a temperature suitable for shrinking such as a temperature of 100-150° C., to get shrinkage of the film and thus a tight package.

As an alternative, pouches can be made with a Vertical Form Fill Seal (VFFS) packaging system that has proven to be very useful in packaging a wide variety of flowable products. The VFFS process is known to those of skilled in the art and described for instance in U.S. Pat. No. 4,589,247. A flowable product is introduced through a central, vertical fill tube to a formed tubular film of the invention, which has been sealed transversely at its lower end, and longitudinally. The pouch is then completed by sealing the upper end of the tubular segment, and severing the pouch from the tubular film above it.

A FFS machine, either Horizontal or Vertical, typically includes a former for forming a flat web of film into a tubular configuration, a longitudinal sealer to seal the overlapped longitudinal edges of the film in the tubular configuration, a conveyor for feeding the products into the tubular film one after the other in suitably spaced configuration, or a feeding tube for soft, fluid or powder products (flowable products) in case of a VFFS machine, and a transverse sealer for sealing the tubular film in a cross-wise direction to separate the products into discrete packages.

Suitable machines for the flowpack process include Ilapak Delta 2000 and 3000 or Ulma Baltic, Artic or Pacific.

In one embodiment, the package of the present invention comprises the thermoformed support according to the invention, a product placed on the support, and a lid, which is hermetically sealed all around onto said support, thus enclosing the product. The lid can preferably be a polyolefin film or at least have a polyolefin sealant layer, more preferably is a film according to the invention, which is sealed onto the thermoformed support made of a film according to the invention.

Alternatively, a package can be manufactured which comprises the thermoformed support according to the invention, a product placed on the support, and a film wrapped around both the support and the product, which thus encloses the product and the support. The wrapping film can preferably be a polyolefin film, more preferably is a film according to the invention.

In the packages according to the present invention described above, the product is preferably a food product, preferably a fresh food product which is generally packaged in the packages described above. Examples of these products are fresh meat, processed meat, fish, cheese, fruits, vegetables.

The films of the present invention are suitable to be used also for cooking or heating in microwave ovens. Therefore, the products packaged in films according to the present invention can also be the so-called "ready-meals", i.e. ready-prepared foods, which only need to be cooked or heated by the final consumer in a microwave oven.

A further object of the present invention is the use of the film according to the present invention for packaging a product, preferably a food product. Typically, food products that can advantageously be packaged with the film of the invention are fresh food products such as fresh meat, processed meat, fish, cheese, fruits, vegetables, as well as ready meals.

Examples

The present invention can be further understood by reference to the following examples that are merely illustrative and are not to be interpreted as a limitation to the scope of the claims.

In the films according to the examples, the polymers and compositions indicated in Table 1 below were used.

TABLE 1

| Polymers and compositions | | |
| --- | --- | --- |
| TRADENAME | SUPPLIER | ACRONYM |
| ELTEX P KS350 | INEOS Olefins & polymers Europe | EPC1 |
| — | — | EPC2 |
| ELTEX P KS400 | INEOS Olefins & polymers Europe | EPC3 |
| ADMER QF551E | Mitsui Chemical | PP-md |
| EVAL SP292B | Evalca/Kuraray | EVOH |
| HC 101 BF | Borealis | PP |

TABLE 1-continued

| Polymers and compositions | | |
|---|---|---|
| TRADENAME | SUPPLIER | ACRONYM |
| ELVAX 3170 | Dow | EVA1 |
| — | — | EVA2 |

EPC1: Copolymer of propylene, ethylene and butene—Density 0.895 g/cc, Melt Flow Rate (230° C./02.16 kg) 5.0 g/10 min, Melting point 131° C., Vicat softening point 105° C.;

EPC2: AntiBlock (silica) and Slip (amide waxes) in Propylene/Ethylene Copolymer, Ashes content 0.5%, Melt Flow Rate (230° C./02.16 kg) 8.0 g/10 min;

EPC3: Copolymer of propylene and ethylene with Anti-Block and Slip—Comonomer (ethylene) content 3.40 wt %, Density 0.895 g/cc, Melt Flow Rate (230° C./02.16 kg) 5.0 g/10 min, Melting point 134° C., Vicat softening point 120° C.;

PP-md: Maleic Anhydride-Modified Polypropylene Random Copolymer, Density 0.89 g/cc, Melt Flow Rate (230° C./02.16 kg) 4.4 g/10 min;

EVOH: Hydrolyzed Ethylene/Vinyl Acetate Copolymer—Comonomer (ethylene) content 44 mol %; Density 1.14 g/cc, Melt Flow Rate (190° C./02.16 kg) 2.1 g/10 min, Melt Flow Rate (230° C./02.16 kg) 8.2 g/10 min, Melting point 161° C.;

PP: Polypropylene Homopolymer; Density 0.903 g/cc, Melt Flow Rate (230° C./02.16 kg) 3.20 g/10 min; Melting point 161° C.;

EVA1: Ethylene/Vinyl Acetate Copolymer— Comonomer (Vinyl Acetate) content 18 wt %, Density 0.94 g/cc, Melt Flow Rate (190° C./02.16 kg) 2.5 g/10 min; Melting point 90° C.;

EVA2: AntiBlock (silica) and Slip (amide waxes) in Ethylene/Vinyl Acetate Copolymer;

TABLE 2

| | | Films | | |
|---|---|---|---|---|
| Film n. | Layer | Layer composition | Layer thickness (microns) | Film thickness (microns) |
| 1 | 1 | 90% EPC1 10% EPC2 | 5 | 25 |
| | 2 | 100% EPC3 | 5 | |
| | 3 | 100% PP-md | 2 | |
| | 4 | 100% EVOH | 1.8 | |
| | 5 | 100% PP-md | 2 | |
| | 6 | 100% EPC3 | 6.8 | |
| | 7 | 90% PP 10% EPC2 | 2.5 | |
| 2 | 1 | 80% EVA1 20% EVA2 | 5 | 25 |

TABLE 2-continued

| | | Films | | |
|---|---|---|---|---|
| Film n. | Layer | Layer composition | Layer thickness (microns) | Film thickness (microns) |
| | 2 | 100% EPC3 | 5 | |
| | 3 | 100% PP-md | 2 | |
| | 4 | 100% EVOH | 1.8 | |
| | 5 | 100% PP-md | 2 | |
| | 6 | 100% EPC3 | 6.8 | |
| | 7 | 90% PP 10% EPC2 | 2.5 | |

Films 1 and 2 were manufactured through a triple bubble coextrusion process according to the following steps. The main operating conditions used in the process for each film are reported in Table 3 below.

Each resin or blend of resins forming a film layer was processed in an extruder. All the layers were co-extruded through a round die to form a multilayer molten tube.

The molten tube coming out from the round die was quenched (cooled) through a cold water cascade ring while a light vacuum was applied to suck it in contact with the internal side of a calibrator unit, in order to improve its stability and dimension, then passed through a series of deflate rolls and lay-flattened.

The quenched flattened tube (so-called tape) was conveyed to the orientation tower, passed through a couple of pinch rolls and then through a series of IR preheating ovens emitting IR radiation at a wavelength from 2500 cm$^{-1}$ to 3000 cm$^{-1}$. The pre-heated tape was then passed through a series of IR orientation ovens emitting IR radiation at a wavelength from 2500 cm$^{-1}$ to 3000 cm$^{-1}$, wherein a temperature gradient was set to progressively heat the tape to its orientation temperature. Orientation occurred by pulling the heated tape from top to bottom and inflating it with compressed air to form the orientation bubble. As a result, an oriented film in tubular form was obtained, whose orientation ratios in LD and TD are shown in Table 3.

The oriented film in tubular form was cooled, flattened in a double layflat format by converging rolls and conveyed to the heat-setting tower. After passing it through a couple of pinch rolls, the tubular film was blown again in a bubble form (third bubble) without orienting it, while heating it to its heat-setting temperature through a series of IR heat-setting ovens to obtain a heat-set tubular film. During the heat-setting step the film undergoes some relaxation in both MD and TD directions and some of its shrink features (free shrink and shrink tension) are removed. The heat-relaxation % ratios in LD and TD are shown in Table 3.

The annealed tubular film was pulled and flattened by converging rolls to form a double layflat annealed tubular film, which was then brought to the winder and wound in a tubing form. The tubing was then offline separated and slit into its final width.

TABLE 3

| | | process conditions | | | | |
|---|---|---|---|---|---|---|
| Film n. | Orientation temperature (° C.) | Orientation ratio (%) in LD | Orientation ratio (%) in TD | Heat-setting temperature (° C.) | Heat-relaxation ratio (%) in LD | Heat-relaxation ratio (%) in TD |
| 1 | 105° C. | 5.25 | 4.66 | 93.5 | −1 | −5.5 |
| 2 | 98° C. | 5.5 | 4.64 | 68 | −8 | −13.4 |

Films 1 and 2 were evaluated for their mechanical and shrink properties and the resulting values are reported in the following Table 4.

Evaluation of elastic modulus, elongation at break and tensile strength at break was performed on an Instron 5564 dynamometer in accordance with ASTM D 882 at 23° C. The values reported in Table 4 are the average values of six specimens tested.

The values of free shrink and maximum shrink tension reported in Table 4 are the average of three specimens tested.

TABLE 4

| mechanical properties of the films | | |
|---|---|---|
| | Film 1 | Film 2 |
| elastic modulus (kg/cm$^2$) in LD (*) | 13900 | 12100 |
| elastic modulus (kg/cm$^2$) in TD (*) | 11900 | 11200 |
| elongation at break (%) in LD (*) | 110 | 100 |
| elongation at break (%) in TD (*) | 90 | 100 |
| tensile strength at break (kg/cm$^2$) in LD (*) | 1420 | 1320 |
| tensile strength at break (kg/cm$^2$) in TD (*) | 1150 | 1100 |
| free shrink at 100° C. (%) in LD (**) | 7 | 10 |
| free shrink at 100° C. (%) in TD (**) | 8 | 14 |
| free shrink at 120° C. (%) in LD (**) | 27 | 32 |
| free shrink at 120° C. (%) in TD (**) | 32 | 37 |
| free shrink at 140° C. (%) in LD (**) | 56 | 55 |
| free shrink at 140° C. (%) in TD (**) | 54 | 56 |
| maximum shrink tension (kg/cm$^2$) in LD (***) | 23.7 | 19.7 |
| | (131° C.) | (130° C.) |
| maximum shrink tension (kg/cm$^2$) in TD (***) | 21.4 | 21.4 |
| | (127° C.) | (117° C.) |

(*) measured in accordance to ASTM D 882 at 23° C.

() measured in accordance to ASTM D2732 in oil (*) measured according to the method in the Description, setting up a ramp up to 180° C.; in parenthesis the temperature at which the maximum shrink tension was observed.

The invention claimed is:

1. A biaxially oriented, coextruded, multilayer packaging film comprising at least the following layers:

an outer heat sealable layer a) comprising polymers selected from the group of ethylene-alpha-olefin copolymers, polybutylene (PB), ethylene vinyl acetate copolymers (EVA), ethylene(meth)acrylate/(meth) acrylic acid copolymers, ethylene butyl acrylate copolymers (EBA) and mixtures thereof, the total amount of ethylene vinyl acetate copolymers (EVA), ethylene (meth)acrylate/(meth)acrylic acid copolymers and ethylene butyl acrylate copolymers (EBA) in the heat sealable layer being not higher than 30% by weight based on the total weight of the film;

an inner gas barrier layer b) comprising ethylene-vinyl alcohol (EVOH), wherein the EVOH content is comprised between 3% and 25% by weight based on the total weight of the film; and an outer layer c) comprising one or more polyolefins, wherein the film:

has a gloss value at 60° higher than 100 g.u. measured in accordance to ASTM D2457, comprises at least 90% by weight of one or more polyolefins based on the total weight of the film, does not contain any polyamide or polyester, and has at least one of the following features:

elastic modulus higher than 4000 kg/cm$^2$ in both the longitudinal direction (LD) and the transverse direction (TD), measured in accordance to ASTM D 882 at 23° C.;

elongation at break of at most 200% in both the longitudinal direction (LD) and the transverse direction (TD), measured in accordance to ASTM D 882 at 23° C.;

tensile strength at break higher than 500 kg/cm$^2$ in both the longitudinal direction (LD) and the transverse direction (TD), measured in accordance to ASTM D 882 at 23° C.

2. The film of claim 1, wherein the film does not contain any polymers other than polyolefins, ethylene vinyl acetate copolymers (EVA), ethylene(meth)acrylate/(meth)acrylic acid copolymers, ethylene butyl acrylate copolymers (EBA) and EVOH.

3. The film of claim 1, wherein the heat sealable layer a) comprises ethylene(meth)acrylate and/or (meth)acrylic acid copolymers and wherein:

said ethylene(meth)acrylate copolymers are selected from ethylene $C_1$-$C_4$ alkyl (meth)acrylate copolymers, ethylene methyl (meth)acrylate copolymers, ethylene ethyl (meth)acrylate copolymers and ethylene-butyl (meth)acrylate copolymers, and/or said(meth)acrylic acid copolymers are in form of ionomers.

4. The film of claim 1, wherein the polyolefins in the outer layer c) are selected from the group consisting of:

ethylene polymers, long chain branching polyethylene (PE), HDPE or MDPE, LLDPE, propylene polymers, polypropylene (PP), copolymers of ethylene and propylene (EP), and mixtures thereof.

5. The film of claim 1, wherein the ratio between the elastic moduli measured in LD and in TD and/or the ratio between the elongations at break measured in LD and in TD and/or the ratio between the tensile strengths at break measured in LD and in TD, varies at most of ±25% with respect to the unit.

6. The film of claim 1 having either:

i) a free shrink lower than 15% in both LD and TD, measured at 120° C. in oil according to ASTM D2732 and, a maximum shrink tension, measured according to the method of the present description, not higher than 25 kg/cm$^2$ both in LD and in TD; or ii) a free shrink higher than 20% in both LD and TD, measured at 85° C. in water according to ASTM D2732 or higher than 15% in both LD and TD, measured at 120° C. in oil according to ASTM D2732 and, a maximum shrink tension, measured according to the method of the present description, not higher than 35 kg/cm$^2$ both in LD and in TD.

7. The film of claim 1, further comprising an inner layer d), directly adhered to the outer heat sealant layer a), the layer d) consisting essentially of polymers selected from the group consisting of polyolefins, ethylene vinyl acetate copolymers (EVA), ethylene(meth)acrylate/(meth)acrylic acid copolymers, ethylene butyl acrylate copolymers (EBA) and mixtures thereof, wherein the total amount of EVA, ethylene (meth)acrylate/(meth)acrylic acid copolymers and EBA in the film is not higher than 30% by weight based on the total weight of the film, and, optionally, comprising at least 5% by weight of polybutylene based on the total weight of layer d).

8. The film of claim 1, having a total thickness comprised between 4 and 120 microns.

9. The film of claim 1, wherein the film is not crosslinked.

10. The film of claim 1 being a first film and heat-sealed to itself or heat sealed to a second film to form a flexible container, the second film, if of a different composition from the first film, the second film being a polyolefin based film.

11. The film according to claim 10 further comprising a product, placed into said flexible container, optionally wherein the product is placed on a rigid or semi-rigid support.

12. A package comprising a biaxially oriented, coextruded, multilayer packaging film comprising at least the following layers:

an outer heat sealable layer a) comprising polymers selected from the group of ethylene-alpha-olefin copolymers, polybutylene (PB), ethylene vinyl acetate copolymers (EVA), ethylene(meth)acrylate/(meth) acrylic acid copolymers, ethylene butyl acrylate copolymers (EBA) and mixtures thereof, the total amount of ethylene vinyl acetate copolymers (EVA), ethylene (meth)acrylate/(meth)acrylic acid copolymers and ethylene butyl acrylate copolymers (EBA) in the heat sealable layer being not higher than 30% by weight based on the total weight of the film;

an inner gas barrier layer b) comprising ethylene-vinyl alcohol (EVOH), wherein the EVOH content is comprised between 3% and 25% by weight based on the total weight of the film; and an outer layer c) comprising one or more polyolefins, wherein the film:

has a gloss value at 60° higher than 100 g.u. measured in accordance to ASTM D2457, comprises at least 90% by weight of one or more polyolefins based on the total weight of the film, does not contain any polyamide or polyester, and has at least one of the following features:

elastic modulus higher than 4000 kg/cm$^2$ in both the longitudinal direction (LD) and the transverse direction (TD), measured in accordance to ASTM D 882 at 23° C.;

elongation at break of at most 200% in both the longitudinal direction (LD) and the transverse direction (TD), measured in accordance to ASTM D 882 at 23° C.;

tensile strength at break higher than 500 kg/cm$^2$ in both the longitudinal direction (LD) and the transverse direction (TD), measured in accordance to ASTM D 882 at 23° C., and a product packaged therein.

13. The package according to claim 12 comprising a rigid or semi-rigid support, the product placed onto said support, and the multilayer packaging film having a free shrink lower than 15% in both longitudinal direction (LD) and transverse direction (TD), measured at 120° C. in oil according to ASTM D2732, wherein the outer heat sealable layer a) of the film is in contact with or faces the product, and the film is hermetically sealed onto said support.

14. The package according to claim 13 wherein the support is selected from PET, APET, PP and PE.

15. The package of claim 12 comprising a product and the multilayer packaging film wrapped around such product, wherein the film has:

i) a free shrink higher than 20% in both longitudinal direction (LD) and transverse direction (TD), measured at 85° C. in water according to ASTM D2732 or ii) a free shrink higher than 15% in both LD and TD, measured at 120° C. in oil according to ASTM D2732 and wherein the outer heat sealable layer a) of the film is in contact with or faces the product.

16. The package according to claim 12 comprising a rigid or semi-rigid support, the product placed onto said support and the multilayer packaging film wrapped around both said support and said product, wherein the wrapped film has a free shrink lower than 15% in both longitudinal direction (LD) and transverse direction (TD), measured at 120° C. in oil according to ASTM D2732 and wherein the outer heat sealable layer a) of the film is in contact with or faces the product.

17. The package according to claim 12 wherein the packaged product is a food product selected from the group consisting of fresh red meat, processed meat, fish, poultry, cheese, fruits and vegetables.

18. A triple bubble process for manufacturing a biaxially oriented, coextruded, multilayer packaging film, such process comprising, in order, the steps of:

i) co-extruding through a round die the melted thermoplastic polymers of the film, to form a co-extruded multilayer tube comprising at least layers a), b) and c), ii) cooling the co-extruded multilayer tube to a temperature below the lowest melting point of the thermoplastic polymers, and passing it through deflate rolls, providing a flat tube (6), iii) moving the tube through a couple of pinch rolls (5) and pre-heating the tube to a temperature comprised between 80° C. and 130° C. through pre-heating ovens (1, 2) emitting infrared radiation (IR), iv) further heating the pre-heated tube to keep its temperature between 80° C. and 130° C. through heating orientation oven(s) (3) emitting infrared radiation (IR), while biaxially orienting the tube by longitudinally pulling it through a couple of deflate rolls and transversally expanding it by blowing a gas in the multilayer tube, with an orientation ratio, in both the longitudinal direction and the transverse direction, comprised between 2.5:1 and 6:1, thus providing a biaxially oriented tube (8), v) cooling the oriented tube (8), passing it through a series of converging rolls and lay-flattening it, vi) optionally bringing the temperature of the lay flattened film to a temperature between 40° C. and 60° C., vii) heat-setting the tube by longitudinally lifting it up through a couple of pinch rolls and by blowing a gas in the tube, while heating it at a temperature comprised between 60° C. to 150° C., viii) passing the heat-set tube through a series of converging rolls, lay-flattening it and winding it;

wherein in step iii) and step iv) the wavelength of the IR radiation emitted by the pre-heating ovens (1, 2) and by the heating orientation oven(s) (3) matches the absorbance wavelength of the polyolefins; and optionally, in step iv) the pre-heated tube (7) passes through an additional couple of pinch rolls (4) positioned between the pre-heating ovens (1, 2) and the heating orientation oven(s) (3);

the multilayer packaging film comprising at least the following layers:

an outer heat sealable layer a) comprising polymers selected from the group of ethylene-alpha-olefin copolymers, polybutylene (PB), ethylene vinyl acetate copolymers (EVA), ethylene(meth)acrylate/(meth) acrylic acid copolymers, ethylene butyl acrylate copolymers (EBA) and mixtures thereof, the total amount of ethylene vinyl acetate copolymers (EVA), ethylene (meth)acrylate/(meth)acrylic acid copolymers and ethylene butyl acrylate copolymers (EBA) in the heat sealable layer being not higher than 30% by weight based on the total weight of the film;

an inner gas barrier layer b) comprising ethylene-vinyl alcohol (EVOH), wherein the EVOH content is comprised between 3% and 25% by weight based on the total weight of the film; and an outer layer c) comprising one or more polyolefins, wherein the film:

has a gloss value at 60° higher than 100 g.u. measured in accordance to ASTM D2457, comprises at least 90% by weight of one or more polyolefins based on the total weight of the film, does not contain any polyamide or polyester, and has at least one of the following features:

elastic modulus higher than 4000 kg/cm$^2$ in both the longitudinal direction (LD) and the transverse direction (TD), measured in accordance to ASTM D 882 at 23° C.;

elongation at break of at most 200% in both the longitudinal direction (LD) and the transverse direction (TD), measured in accordance to ASTM D 882 at 23° C.;

tensile strength at break higher than 500 kg/cm$^2$ in both the longitudinal direction (LD) and the transverse direction (TD), measured in accordance to ASTM D 882 at 23° C.

19. The process of claim 18 further comprising the step of thermoforming the multilayer packaging film to form a thermoformed support.

* * * * *